US011465627B2

(12) United States Patent
Oka et al.

(10) Patent No.: US 11,465,627 B2
(45) Date of Patent: Oct. 11, 2022

(54) TRAVELING CONTROL APPARATUS, TRAVELING CONTROL METHOD, AND NON-TRANSITORY COMPUTER-READABLE STORAGE MEDIUM STORING PROGRAM FOR CONTROLLING TRAVELING OF A VEHICLE

(71) Applicant: HONDA MOTOR CO., LTD., Tokyo (JP)

(72) Inventors: Keisuke Oka, Wako (JP); Takeru Goto, Wako (JP); Shun Iwasaki, Wako (JP); Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 16/823,272

(22) Filed: Mar. 18, 2020

(65) Prior Publication Data
US 2020/0307599 A1    Oct. 1, 2020

(30) Foreign Application Priority Data
Mar. 25, 2019  (JP) .............................. JP2019-057024

(51) Int. Cl.
*B60W 30/18* (2012.01)
*B60W 60/00* (2020.01)
*B60W 40/04* (2006.01)

(52) U.S. Cl.
CPC ...... *B60W 30/18163* (2013.01); *B60W 40/04* (2013.01); *B60W 60/00276* (2020.02); *B60W 2554/80* (2020.02)

(58) Field of Classification Search
CPC ..... B60W 30/18163; B60W 60/00276; B60W 40/04; B60W 2554/80
See application file for complete search history.

(56) References Cited

U.S. PATENT DOCUMENTS 10,131,306 B2   11/2018  Takae et al.
10,290,214 B2    5/2019  Zhang
(Continued)

FOREIGN PATENT DOCUMENTS

JP      4882957 B2 *  2/2012
JP    2014-019332 A   2/2014
(Continued)

OTHER PUBLICATIONS

Office Action for U.S. Appl. No. 16/823,266 dated Sep. 17, 2021.
(Continued)

*Primary Examiner* — Michael A Berns
(74) *Attorney, Agent, or Firm* — Thomas | Horstemeyer, LLP

(57) ABSTRACT

A first possible space, for which a lane change of the vehicle is possible, is specified from an inter-vehicle distance between the preceding other vehicle and the nearby vehicle, a speed of the preceding other vehicle, and a speed of the nearby vehicle. A second possible space, for which the lane change of the vehicle is possible, is specified from an inter-vehicle distance between the nearby vehicle and the following other vehicle, the speed of the nearby vehicle, and a speed of the following other vehicle. The control unit controls the traveling of the vehicle to make the lane change to the adjacent lane based on a result of the evaluation of the first possible space and the second possible space.

14 Claims, 14 Drawing Sheets

(56) References Cited

U.S. PATENT DOCUMENTS

| | | |
|---|---|---|
| 10,351,137 B2 * | 7/2019 | Shin ................ B60W 30/18163 |
| 10,543,840 B2 | 1/2020 | Takeda |
| 10,759,432 B2 | 9/2020 | Takeda |
| 11,136,039 B2 | 10/2021 | Kang |
| 11,242,060 B2 * | 2/2022 | Jafari Tafti .......... G05D 1/0088 |
| 11,285,957 B2 * | 3/2022 | Kumano ......... B60W 30/18163 |
| 11,348,463 B2 * | 5/2022 | Iwasaki ................ G06V 20/588 |
| 11,358,599 B2 * | 6/2022 | Oka ........................ G08G 1/167 |
| 11,390,278 B2 * | 7/2022 | Mahajan ............... B60W 40/04 |
| 11,392,128 B1 * | 7/2022 | Ma ....................... G05D 1/0088 |
| 2017/0259819 A1 | 9/2017 | Takeda |
| 2018/0170388 A1 * | 6/2018 | Shin ................ B60W 30/18163 |
| 2018/0201272 A1 | 7/2018 | Takeda |
| 2018/0222423 A1 | 8/2018 | Takae et al. |
| 2018/0293894 A1 | 10/2018 | Zhang |
| 2018/0348757 A1 | 12/2018 | Mimura et al. |
| 2019/0016339 A1 | 1/2019 | Ishioka |
| 2019/0071075 A1 | 3/2019 | Mimura |
| 2019/0071093 A1 * | 3/2019 | Ma .................. B60W 30/18163 |
| 2019/0143972 A1 | 5/2019 | Ishioka et al. |
| 2020/0189596 A1 | 6/2020 | Kang |
| 2020/0307599 A1 * | 10/2020 | Oka ................ B60W 60/00276 |

FOREIGN PATENT DOCUMENTS

| | | | |
|---|---|---|---|
| WO | 2017/141765 | 8/2017 | |
| WO | WO-2017159509 A1 * | 9/2017 | ............. B60Q 1/346 |
| WO | 2018/163349 A1 | 9/2018 | |

OTHER PUBLICATIONS

Office Action for U.S. Appl. No. 16/823,270 dated Sep. 17, 2021.

U.S. Appl. No. 16/823,266, filed Mar. 18, 2020 (this is an application that is related to the present application).

U.S. Appl. No. 16/823,270, filed Mar. 18, 2020 (this is an application that is related to the present application).

* cited by examiner

TRAVELING CONTROL APPARATUS, TRAVELING CONTROL METHOD, AND NON-TRANSITORY COMPUTER-READABLE STORAGE MEDIUM STORING PROGRAM FOR CONTROLLING TRAVELING OF A VEHICLE

CROSS-REFERENCE TO RELATED APPLICATION(S)

This application claims priority to and the benefit of Japanese Patent Application No. 2019-057024 filed on Mar. 25, 2019, the entire disclosure of which is incorporated herein by reference.

BACKGROUND OF THE INVENTION

Field of the Invention

The present invention relates to a traveling control apparatus for controlling traveling of a vehicle, a traveling control method, and a non-transitory computer-readable storage medium storing a program.

Description of the Related Art

In recent years, techniques of automatically controlling traveling of a vehicle are known. A technique of performing a lane change is one of them. International Publication No. 2017/141765 describes that if a preceding traveling vehicle that is traveling ahead a self-vehicle on a lane on which the self-vehicle is traveling, and a preceding reference vehicle and a following reference vehicle which are traveling on an adjacent lane exist as peripheral vehicles traveling on the periphery of the self-vehicle, a lane change is made to a target set between the preceding reference vehicle and the following reference vehicle in consideration of the future positions of the peripheral vehicles.

However, International Publication No. 2017/141765 does not include a mention concerning how to perform the lane change if a plurality of targets for enabling a lane change exist.

SUMMARY OF THE INVENTION

The present invention provides a traveling control apparatus for controlling traveling of a vehicle to appropriately perform a lane change in a case in which a plurality of spaces for enabling a lane change exist, a traveling control method, and a non-transitory computer-readable storage medium storing a program.

The present invention in its first aspect provides a traveling control apparatus comprising: an acquisition unit configured to acquire information outside a vehicle; a control unit configured to control traveling of the vehicle based on the information outside the vehicle, which is acquired by the acquisition unit; a first specifying unit configured to, if the acquisition unit acquires, as the information outside the vehicle, information of a nearby vehicle traveling near the vehicle on an adjacent lane different from a traveling lane of the vehicle and information of a preceding other vehicle traveling ahead the nearby vehicle, specify a first possible space, for which a lane change of the vehicle is possible, from an inter-vehicle distance between the preceding other vehicle and the nearby vehicle, a speed of the preceding other vehicle, and a speed of the nearby vehicle; a second specifying unit configured to, if the acquisition unit acquires, as the information outside the vehicle, information of the nearby vehicle traveling near the vehicle on the adjacent lane different from the traveling lane of the vehicle and information of a following other vehicle traveling behind the nearby vehicle, specify a second possible space, for which the lane change of the vehicle is possible, from an inter-vehicle distance between the nearby vehicle and the following other vehicle, the speed of the nearby vehicle, and a speed of the following other vehicle; and an evaluation unit configured to evaluate the first possible space specified by the first specifying unit and the second possible space specified by the second specifying unit, wherein the control unit controls the traveling of the vehicle to make the lane change to the adjacent lane based on a result of the evaluation by the evaluation unit.

The present invention in its second aspect provides a traveling control method executed by a traveling control apparatus comprising: acquiring information outside a vehicle; controlling traveling of the vehicle based on the acquired information outside the vehicle; if information of a nearby vehicle traveling near the vehicle on an adjacent lane different from a traveling lane of the vehicle and information of a preceding other vehicle traveling ahead the nearby vehicle are acquired as the information outside the vehicle, specifying a first possible space, for which a lane change of the vehicle is possible, from an inter-vehicle distance between the preceding other vehicle and the nearby vehicle, a speed of the preceding other vehicle, and a speed of the nearby vehicle; if information of the nearby vehicle traveling near the vehicle on the adjacent lane different from the traveling lane of the vehicle and information of a following other vehicle traveling behind the nearby vehicle are acquired as the information outside the vehicle, specifying a second possible space, for which the lane change of the vehicle is possible, from an inter-vehicle distance between the nearby vehicle and the following other vehicle, the speed of the nearby vehicle, and a speed of the following other vehicle; and evaluating the specified first possible space and the specified second possible space, wherein in the controlling, the traveling of the vehicle is controlled to make the lane change to the adjacent lane based on a result of the evaluation.

The present invention in its third aspect provides a non-transitory computer-readable storage medium storing a program configured to cause a computer to function to: acquire information outside a vehicle; control traveling of the vehicle based on the acquired information outside the vehicle; if information of a nearby vehicle traveling near the vehicle on an adjacent lane different from a traveling lane of the vehicle and information of a preceding other vehicle traveling ahead the nearby vehicle are acquired as the information outside the vehicle, specify a first possible space, for which a lane change of the vehicle is possible, from an inter-vehicle distance between the preceding other vehicle and the nearby vehicle, a speed of the preceding other vehicle, and a speed of the nearby vehicle; if information of the nearby vehicle traveling near the vehicle on the adjacent lane different from the traveling lane of the vehicle and information of a following other vehicle traveling behind the nearby vehicle are acquired as the information outside the vehicle, specify a second possible space, for which the lane change of the vehicle is possible, from an inter-vehicle distance between the nearby vehicle and the following other vehicle, the speed of the nearby vehicle, and a speed of the following other vehicle; and evaluate the specified first possible space and the specified second possible space, wherein in the control, the traveling of the vehicle is controlled to make the lane change to the adjacent lane based on a result of the evaluation.

According to the present invention, it is possible to control traveling of a vehicle to appropriately perform a lane change in a case in which a plurality of spaces for enabling a lane change exist.

DESCRIPTION OF THE EMBODIMENTS

Figure 1:
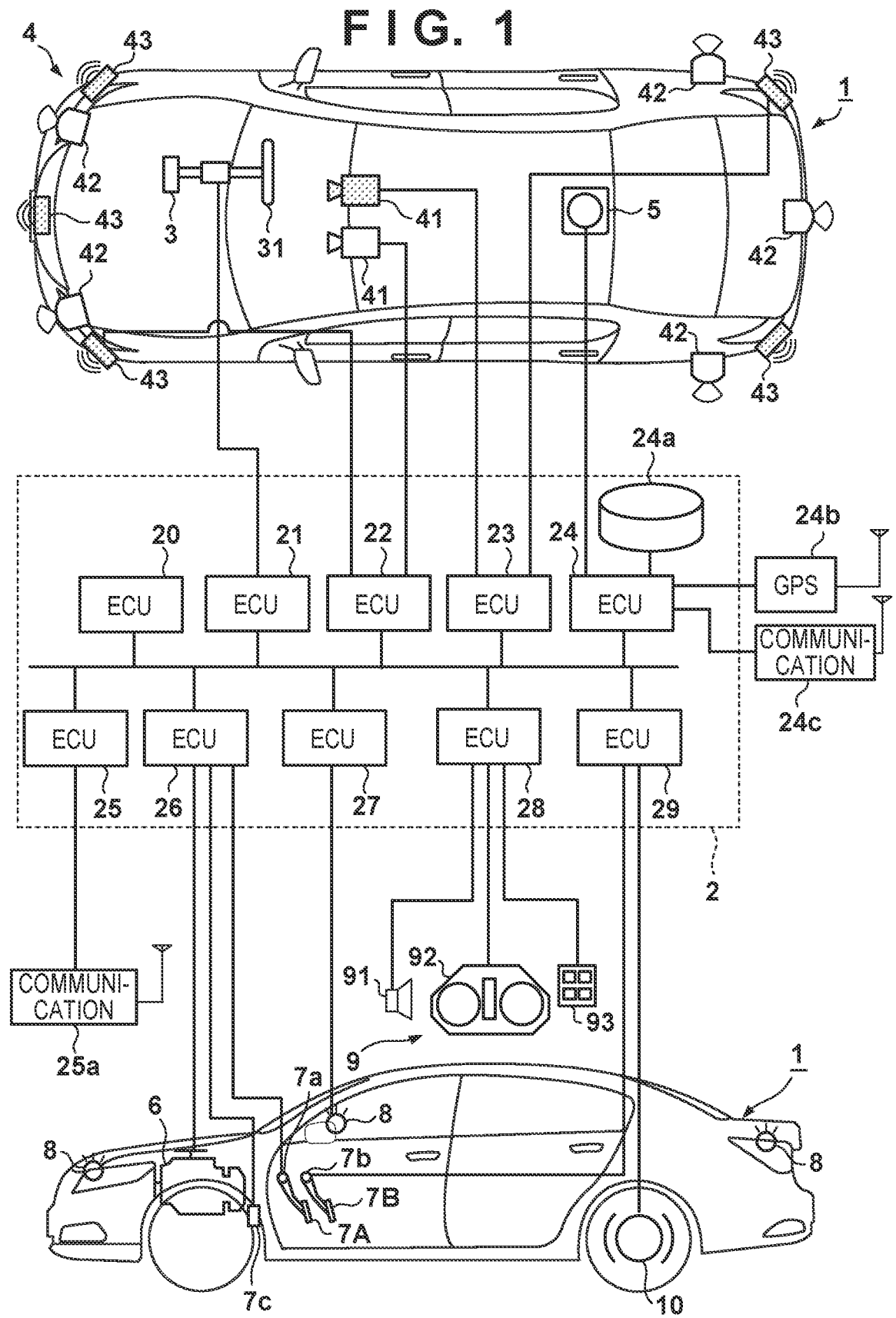
FIG. 1 is a view showing the arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control apparatus (traveling control apparatus) according to an embodiment of the present invention, and a vehicle 1 is controlled. FIG. 1 shows the outline of the vehicle 1 by a plan view and a side view. The vehicle 1 is, for example, a sedan-type four-wheeled vehicle.

The traveling control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, the arrangement of the traveling control apparatus shown in FIG. 1 can be a computer configured to execute the present invention concerning a program.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, for example, the contour of a target or a division line (a white line or the like) of a lane on a road can be extracted.

The detection unit 42 is Light Detection and Ranging (LIDAR), and detects a target around the vehicle 1 or measures the distance to a target. In this embodiment, five detection units 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each detection unit 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information, traffic information, and meteorological information and acquires these pieces of information. The ECU 24 can access a map information database 24a formed in the storage device. The ECU 24 searches for a route from the current position to the destination. Note that databases for the above-described traffic information, meteorological information, and the like may be formed in the database 24a.

The ECU 25 includes a communication device 25a for inter-vehicle communication. The communication device 25a performs wireless communication with another vehicle on the periphery and performs information exchange between the vehicles. The communication device 25a has various kinds of functions, and has, for example, a DSRC (Dedicated Short Range Communication) function and a cellular communication function. The communication device 25a may be formed as a TCU (Telematics Communication Unit) including a transmission/reception antenna.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. In addition, the display device 92 may include a navigation device.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Control concerning automated driving of the vehicle 1 executed by the ECU 20 will be described. When the driver instructs a destination and automated driving, the ECU 20 automatically controls traveling of the vehicle 1 to the destination in accordance with a guidance route searched by the ECU 24. In the automatic control, the ECU 20 acquires information (outside information) concerning the peripheral state of the vehicle 1 from the ECUs 22 and 23, and controls steering and acceleration/deceleration of the vehicle 1 by issuing instructions to the ECUs 21, 26, and 29 based on the acquired information.

Figure 2:
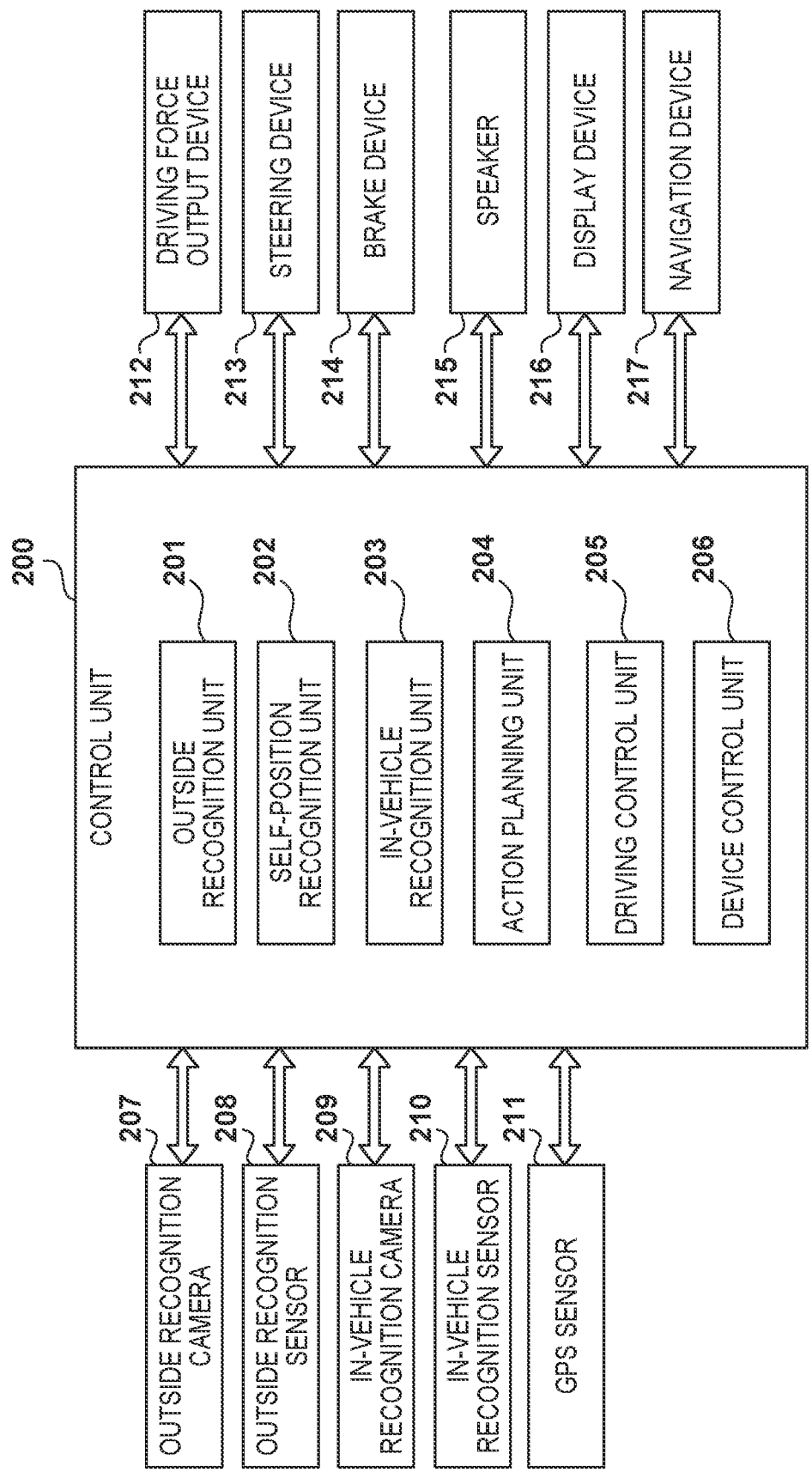
FIG. 2 is a block diagram showing the functional blocks of a control unit.

FIG. 2 is a block diagram showing the functional blocks of the control unit 2. A control unit 200 corresponds to the control unit 2 shown in FIG. 1, and includes an outside recognition unit 201, a self-position recognition unit 202, an in-vehicle recognition unit 203, an action planning unit 204, a driving control unit 205, and a device control unit 206. Each block is implemented by one or a plurality of ECUs shown in FIG. 1.

The outside recognition unit 201 recognizes the outside information of the vehicle 1 based on signals from an outside recognition camera 207 and an outside recognition sensor 208. Here, the outside recognition camera 207 corresponds to, for example, the camera 41 shown in FIG. 1, and the outside recognition sensor 208 corresponds to, for example, the detection units 42 and 43 shown in FIG. 1. The outside recognition unit 201 recognizes, for example, a scene such as an intersection, a railroad crossing, or a tunnel, a free space such as a road shoulder, and the behavior (the speed, the direction of travel, and the like) of another vehicle based on the signals from the outside recognition camera 207 and the outside recognition sensor 208. The self-position recognition unit 202 recognizes the current position of the vehicle 1 based on a signal from a GPS sensor 211. Here, the GPS sensor 211 corresponds to, for example, the GPS sensor 24b shown in FIG. 1.

The in-vehicle recognition unit 203 identifies the occupant of the vehicle 1 based on signals from an in-vehicle recognition camera 209 and an in-vehicle recognition sensor 210 and recognizes the state of the occupant. The in-vehicle recognition camera 209 is, for example, a near infrared camera installed on the display device 92 inside the vehicle 1, and, for example, detects the direction of the sight line of the occupant. In addition, the in-vehicle recognition sensor 210 is, for example, a sensor configured to detect a biological signal of the occupant. The in-vehicle recognition unit 203 recognizes a drowsy state of the occupant, a working state other than driving, or the like based on the signals.

The action planning unit 204 plans an action of the vehicle 1 such as an optimum route or a risk avoiding route based on the results of recognition by the outside recognition unit 201 and the self-position recognition unit 202. The action planning unit 204, for example, performs entering determination based on the start point or end point of an intersection, a railroad crossing, or the like, and makes an action plan based on a prediction result of the behavior of another vehicle. The driving control unit 205 controls a driving force output device 212, a steering device 213, and a brake device 214 based on the action plan made by the action planning unit 204. Here, the driving force output device 212 corresponds to, for example, the power plant 6 shown in FIG. 1, the steering device 213 corresponds to the electric power steering device 3 shown in FIG. 1, and the brake device 214 corresponds to the brake device 10.

The device control unit 206 controls devices connected to the control unit 200. For example, the device control unit 206 controls a speaker 215 to make it output a predetermined voice message such as a message for a warning or navigation. In addition, the device control unit 206 controls a display device 216 to make it display a predetermined interface screen. The display device 216 corresponds to, for example, the display device 92. Additionally, for example, the device control unit 206 controls a navigation device 217 to acquire setting information in the navigation device 217.

The control unit 200 may include a functional block other than those shown in FIG. 2, and may include, for example, an optimum route calculation unit configured to calculate an optimum route to a destination based on map information acquired via the communication device 24c. The control unit 200 may acquire information from a device other than the cameras and the sensors shown in FIG. 2, and may, for example, acquire the information of another vehicle via the communication device 25a. In addition, the control unit 200 receives detection signals not only from the GPS sensor 211 but also from various kinds of sensors provided in the vehicle 1. For example, the control unit 200 receives a detection signal from a door open/close sensor or a door lock mechanism sensor provided in a door portion of the vehicle 1 via an ECU formed in the door portion. The control unit 200 can thus detect unlock of the door or a door opening/closing operation.

Figure 3:
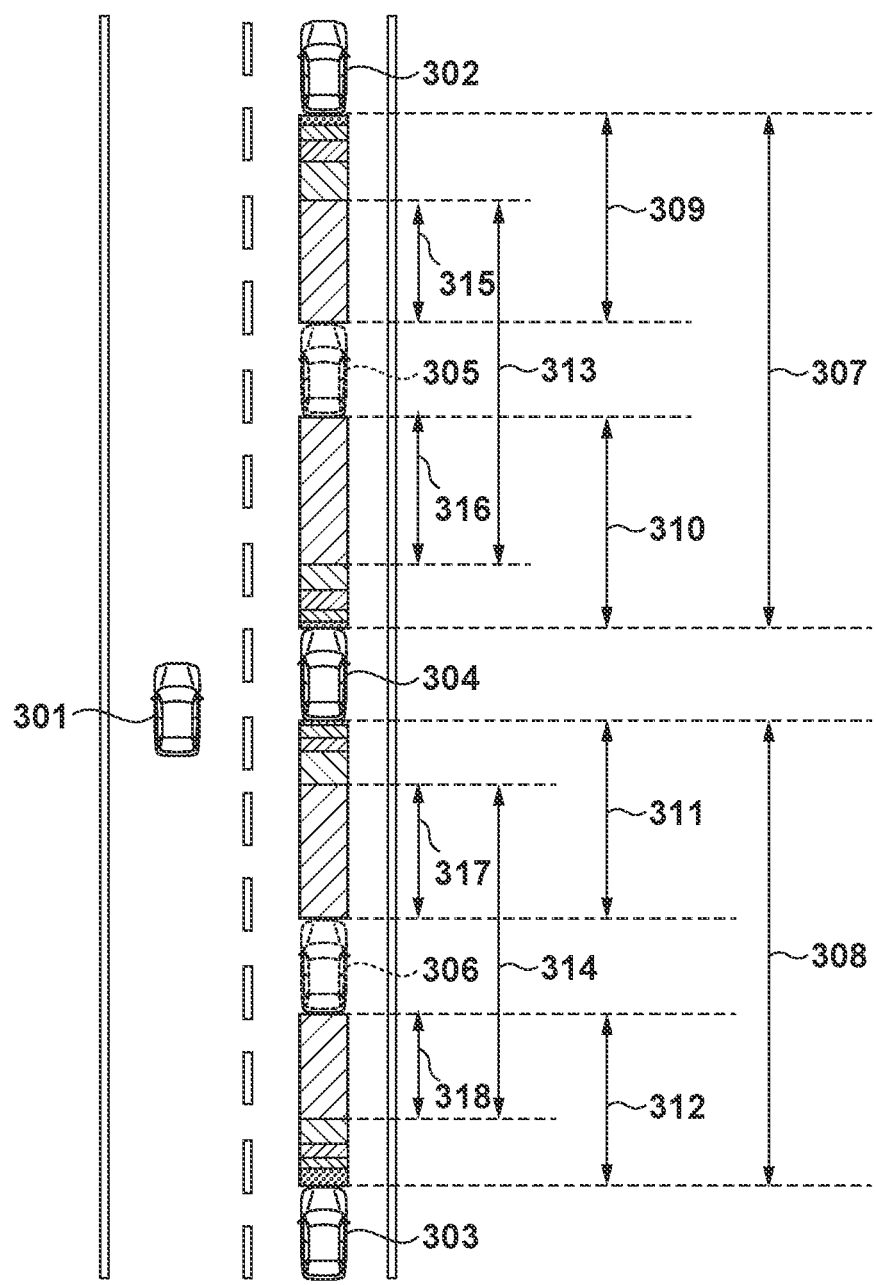
FIG. 3 is a view for explaining an entering operation between vehicles by a lane change.

FIG. 3 is a view for explaining an entering operation between vehicles by a lane change according to this embodiment. Referring to FIG. 3, a self-vehicle 301 is traveling at V0 on a self-lane. A vehicle 302 is a preceding other vehicle that is traveling at a speed Vf on an adjacent lane ahead the self-vehicle 301. A vehicle 303 is a following other vehicle that is traveling at a speed Vr on the adjacent lane behind the self-vehicle 301. A vehicle 304 is a parallel traveling other vehicle that is traveling at a speed Vs on the adjacent lane almost near the self-vehicle 301. In FIG. 3, the vehicle 304 is illustrated as if it were traveling slightly ahead the self-vehicle 301, but the vehicle 304 may travel slightly behind. Hence, in this embodiment, the parallel traveling other vehicle will also be referred to as a nearby vehicle. An inter-vehicle distance 307 represents the inter-vehicle distance between the vehicle 302 and the vehicle 304, and an inter-vehicle distance 308 represents the inter-vehicle distance between the vehicle 304 and the vehicle 303.

When accelerating and then performing a lane change, the self-vehicle 301 enters the inter-vehicle region between the vehicle 302 and the vehicle 304, which is set as a target. Such a lane change will also be referred to as a front lane change hereinafter. A position 305 represents an estimated future position of the self-vehicle 301 in the inter-vehicle region between the vehicle 302 and the vehicle 304 in such a case. On the other hand, when decelerating and then performing a lane change, the self-vehicle 301 enters the inter-vehicle region between the vehicle 304 and the vehicle 303, which is set as a target. Such a lane change will also be referred to as a rear lane change hereinafter. A position 306 represents an estimated future position of the self-vehicle 301 in the inter-vehicle region between the vehicle 304 and the vehicle 303 in such a case. Note that a "position" of a vehicle in this embodiment represents not an absolute position defined by a latitude and a longitude or the like but a relative position between vehicles.

In this embodiment, the position where the self-vehicle 301 actually enters between the vehicles is decided using an acceleration/deceleration prediction map based on an IDM model. In FIG. 3, the position where the self-vehicle actually enters between the vehicles is one of the inter-vehicle region between the vehicle 302 and the vehicle 304 and the inter-vehicle region between the vehicle 304 and the vehicle 303. The position where the self-vehicle actually enters between vehicles will also be referred to as an LC (Lane Change) position hereinafter.

Figure 5:
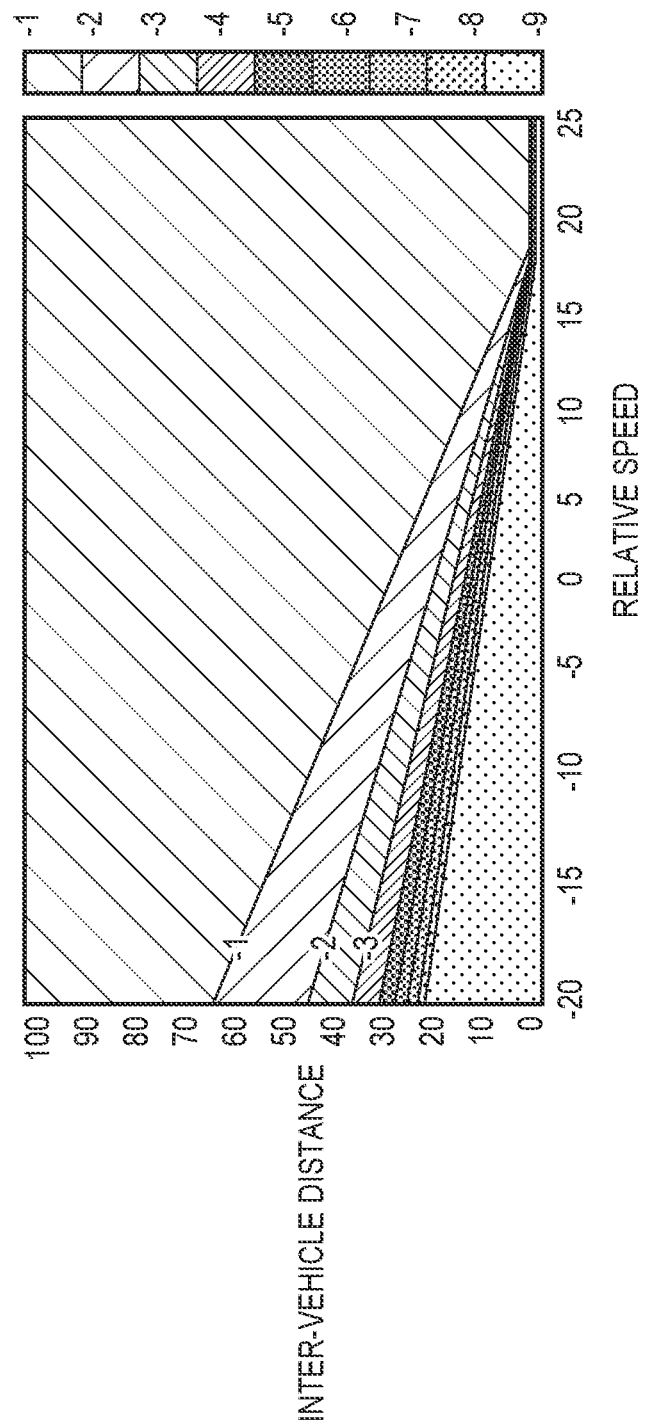
FIG. 5 is a view showing an acceleration/deceleration prediction map.

The acceleration/deceleration prediction map will be described here. FIG. 5 is a view showing an example of the acceleration/deceleration prediction map. The acceleration/deceleration prediction map is based on a car-following model (IDM model: Intelligent Driver Model) for two vehicles, that is, a preceding vehicle and a following vehicle that follows it. In the IDM model, it is known that an acceleration/deceleration α of a following vehicle, which occurs due to the presence of a preceding vehicle, is given by $$\alpha \approx a\left[1 - \left(\frac{v}{v_0}\right)^\delta - \left(\frac{s^*(v, \Delta v)}{s}\right)^2\right] \quad (1)$$

where v is the speed of the preceding vehicle, v0 is the speed of the following vehicle, Δv is the relative speed, δ is an exponential constant, s is the inter-vehicle distance, and s* is the effective inter-vehicle distance. The third term of the right side of equation (1) is a term concerning the inter-vehicle distance and the relative speed, and represents the influence from another vehicle. The acceleration/deceleration α is decided based on the influence from the other vehicle. For example, if the speed relationship is given by speed of following vehicle>speed of preceding vehicle, the speed difference is large, and the inter-vehicle distance is short, the following vehicle receives the impact of the acceleration/deceleration α calculated from the relative speed and the inter-vehicle distance to obtain an optimum inter-vehicle distance, as can be seen.

The abscissa of FIG. 5 represents the relative speed between two vehicles, and the ordinate represents the inter-vehicle distance between two vehicles. In addition, the acceleration/deceleration α calculated by equation (1) is represented by the difference of hatching in FIG. 5. As for a change in the acceleration/deceleration α, although hatching boundaries are clearly shown in FIG. 5, they may change as a gradation. Note that the acceleration/deceleration α represented by hatching is decided by the absolute speed of the following vehicle. In FIG. 5, the distribution of accelerations/decelerations α of a vehicle is shown, based on the IDM model represented by equation (1), on a space defined by the two axes of the relative speed and the inter-vehicle distance between two vehicles. Note that the acceleration/decelerations α may be converted into a G value by defining, for example, −2000 mm/s2=−0.2 G.

Referring to FIG. 3, the hatching indication between the position 305 and the vehicle 302 represents the distribution of the acceleration/deceleration α received by the self-vehicle 301 at the future position at an inter-vehicle distance 309 in a case in which the self-vehicle 301 at the future position at, for example, the position 305 and the vehicle 302 are considered as an IDM model. In particular, a space indicated by a thick hatching in a backward diagonal direction represents that the magnitude of the acceleration/deceleration α received by the self-vehicle 301 at the future position is equal to or less than a predetermined value. For this reason, since the impact that the self-vehicle 301 at the future position receives from the vehicle 302 is relatively small, it is possible to smoothly perform a lane change to an LC possible space 313 as a target.

In addition, the hatching indication between the vehicle 304 and the position 305 represents the distribution of the acceleration/deceleration α received by the vehicle 304 at an inter-vehicle distance 310 in a case in which the vehicle 304 and the self-vehicle 301 at the future position at, for example, the position 305 are considered as an IDM model. In particular, a space indicated by a thick hatching in a backward diagonal direction represents that the magnitude of the acceleration/deceleration α received by the vehicle 304 is equal to or less than a predetermined value. For this reason, since the impact that the vehicle 304 receives from the self-vehicle 301 at the future position is relatively small, it is possible to smoothly perform a lane change to the LC possible space 313 as a target.

Also, the hatching indication between the vehicle 304 and the position 306 represents the distribution of the acceleration/deceleration α received by the self-vehicle 301 at the future position at an inter-vehicle distance 311 in a case in which the vehicle 304 and the self-vehicle 301 at the future position at, for example, the position 306 are considered as an IDM model. In particular, a space indicated by a thick hatching in a backward diagonal direction represents that the magnitude of the acceleration/deceleration α received by the self-vehicle 301 at the future position is equal to or less than a predetermined value. For this reason, since the impact that the self-vehicle 301 at the future position receives from the vehicle 304 is relatively small, it is possible to smoothly perform a lane change to an LC possible space 314 as a target.

The hatching indication between the position 306 and the vehicle 303 represents the distribution of the acceleration/deceleration α received by the vehicle 303 at an inter-vehicle distance 312 in a case in which the self-vehicle 301 at the future position at, for example, the position 306 and the vehicle 303 are considered as an IDM model. In particular, a space indicated by a thick hatching in a backward diagonal direction represents that the magnitude of the acceleration/deceleration α received by the vehicle 303 is equal to or less than a predetermined value. For this reason, since the impact that the vehicle 303 receives from the self-vehicle 301 at the future position is relatively small, it is possible to smoothly perform a lane change to the LC possible space 314 as a target.

In this embodiment, furthermore, to which target the self-vehicle 301 makes a lane change (that is, a front lane change or a rear lane change) is judged based on how the LC possible space 313 and the LC possible space 314 change over time. For example, even if the LC possible space 314 is a relatively large space, if the vehicle 303 is faster than the vehicle 304, the size of the LC possible space 314 abruptly decreases along with the elapse of time. In this case, it is judged that the LC possible space 314 is not appropriate as the target of the lane change. In this embodiment, evaluation is done in consideration of the time-rate changes of the LC possible space 313 and the LC possible space 314, and which LC possible space is to be used as a target to perform a lane change is judged. As a result, it is possible to perform a smooth lane change without impeding traveling of whole traffic.

Figure 6:
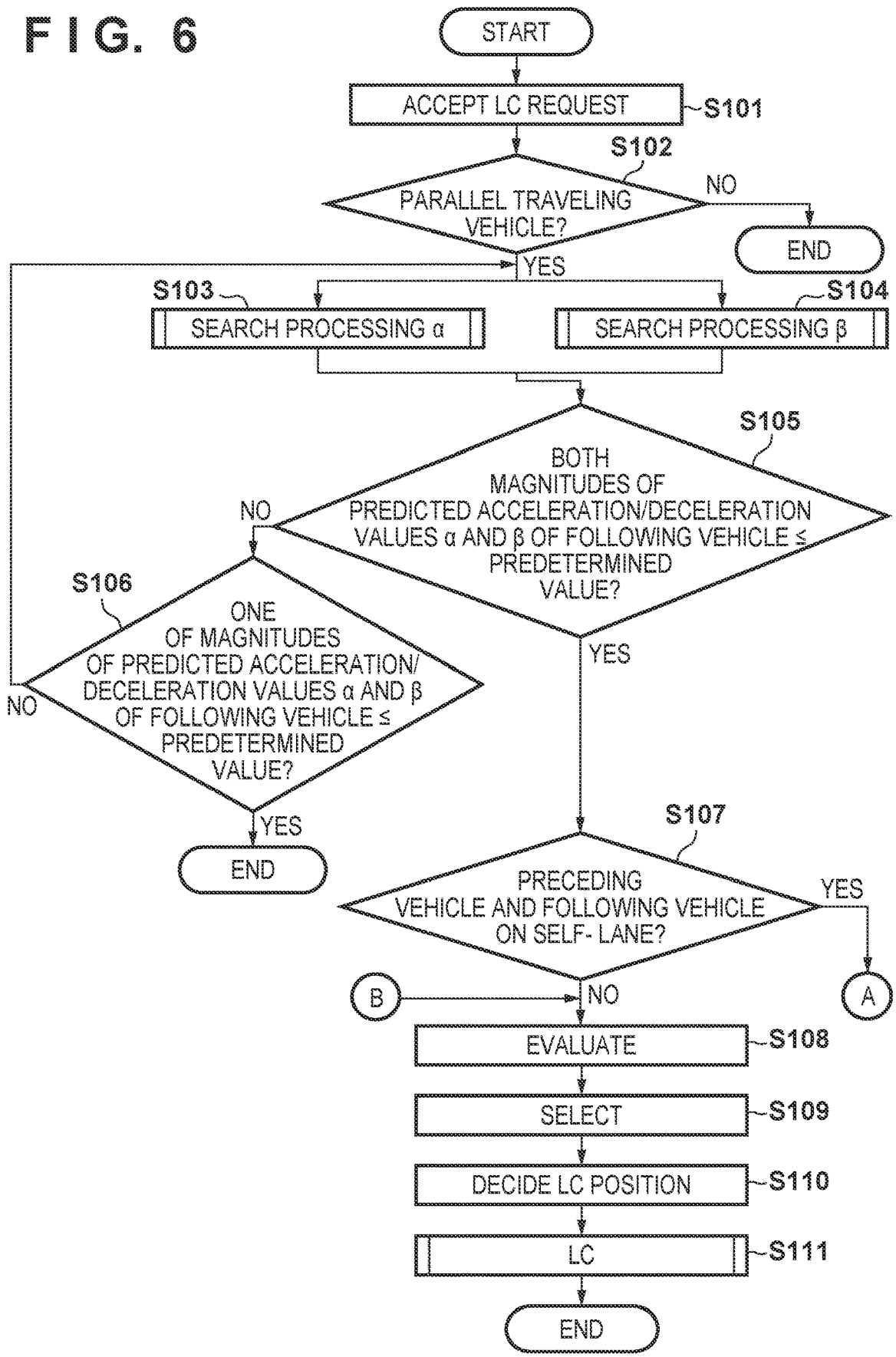
FIG. 6 is a flowchart showing processing of a lane change.

FIG. 6 is a flowchart showing processing of a lane change of the self-vehicle 301 according to this embodiment. Processing shown in FIG. 6 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

In step S101, the control unit 200 accepts a lane change request and, for example, lights a turn signal. In step S102, the control unit 200 determines whether a parallel traveling other vehicle exists. Here, a parallel traveling other vehicle is the vehicle 304 shown in FIG. 3. Upon determining that a parallel traveling other vehicle does not exist, the processing shown in FIG. 6 is ended. Upon determining that a parallel traveling other vehicle exists, the processes of steps S103 and S104 are performed. In step S103, search processing α for searching for the LC possible space 313 is performed. In step S104, search processing β for searching for the LC possible space 314 is performed. Note that in this embodiment, a description will be made assuming that the search processing α of step S103 and the search processing β of step S104 are performed in parallel. However, the search processing β may be performed after the search processing α, or the search processing α may be performed after the search processing β. The search processing operations α and β will be described below with reference to FIG. 8.

Figure 8:
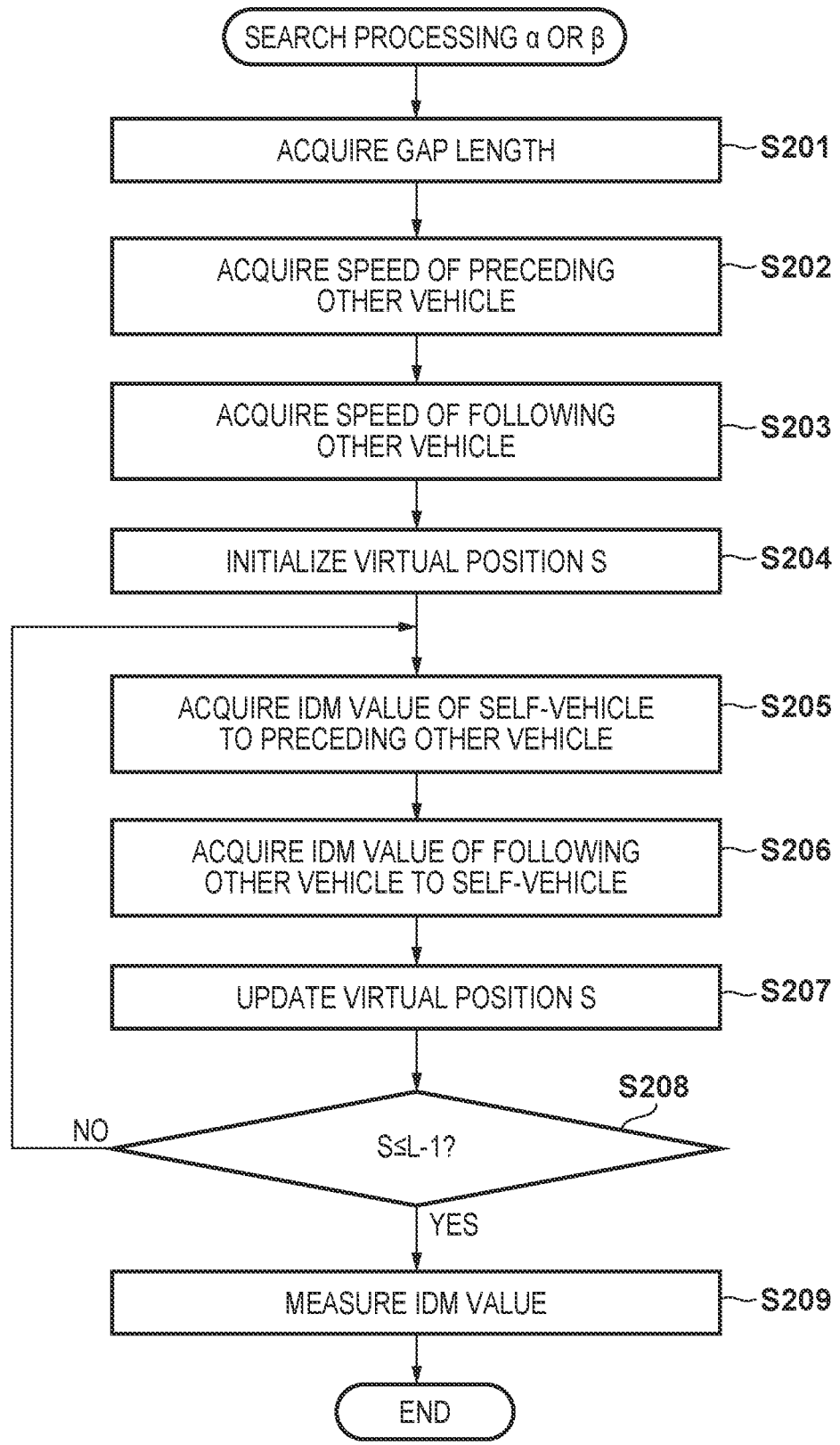
FIG. 8 is a flowchart showing search processing.

FIG. 8 is a flowchart showing the search processing α of step S103. In step S201, the control unit 200 acquires a gap length. Here, the gap length corresponds to the inter-vehicle distance 307 in FIG. 3. Note that in this embodiment, the inter-vehicle distances 307, 308, 309, 310, 311, and 312 and the LC possible spaces 313 and 314 represent distances along the traveling lane.

In step S202, the control unit 200 acquires the speed Vf of the preceding other vehicle. Here, the preceding other vehicle is the vehicle 302. In step S203, the control unit 200 acquires the speed Vr of the following other vehicle. Here, the following other vehicle is the vehicle 304. The control unit 200 acquires the speeds of the preceding other vehicle and the following other vehicle using, for example, the outside recognition camera 207 and the outside recognition sensor 208.

In step S204, the control unit 200 initializes a variable S (virtual position S) representing a virtual position (future position) upon estimating that the self-vehicle 301 has made a lane change to the adjacent lane. The position 305 in FIG. 3 represents one of virtual positions to be used in the processing shown in FIG. 8. The initial value of the virtual position S is, for example, a position 1 m behind the vehicle 302 (S=1).

In step S205, the control unit 200 acquires an IDM value αf of the self-vehicle 301 at the virtual position S with respect to the preceding other vehicle. The IDM value is an example of the predicted acceleration/deceleration value of the following vehicle. In this embodiment, a description will be made using an IDM value obtained using an IDM model as an example. In step S205, the control unit 200 creates an IDM model based on, for example, the speed after acceleration for the lane change of the self-vehicle 301, obtains the IDM value αf from the relative speed and the inter-vehicle distance between the preceding other vehicle and the self-vehicle 301 at the virtual position S, and holds it in the storage area in association with the virtual position S.

In step S206, the control unit 200 acquires an IDM value αr of the following other vehicle with respect to the self-vehicle 301 at the virtual position S. In step S206, the control unit 200 creates an IDM model based on, for example, the speed of the vehicle 304, obtains the IDM value αr from the relative speed and the inter-vehicle distance between the self-vehicle 301 at the virtual position S and the following other vehicle, and holds it in the storage area in association with the virtual position S.

In step S207, the control unit 200 updates the virtual position S. The virtual position S may be, for example, incremented one by one. In step S208, the control unit 200 determines whether a predetermined condition is satisfied, for example, whether the updated virtual position S satisfies "S≤L−1". Here, L corresponds to the inter-vehicle distance 307 shown in FIG. 3. Upon determining that a predetermined condition is satisfied, the process advances to step S209. Upon determining that a predetermined condition is not satisfied, processing from step S205 is repeated.

In step S209, the control unit 200 specifies, as the LC possible space 313, a space including spaces 315 and 316 in which both the accelerations/decelerations αf and αr obtained for each virtual position S have a magnitude equal to or less than a predetermined value (for example, 0.2 or less). That is, when the search processing α in FIG. 8 ends, a space in which the acceleration/deceleration has a predetermined value or less when accelerating and then making a lane change can be specified. After step S209, the processing (search processing α) shown in FIG. 8 is ended.

The search processing β of step S104 will be described next with reference to FIG. 8.

In step S201, the control unit 200 acquires a gap length. Here, the gap length corresponds to the inter-vehicle distance 308 in FIG. 3.

In step S202, the control unit 200 acquires the speed Vf of the preceding other vehicle. Here, the preceding other vehicle is the vehicle 304. In step S203, the control unit 200 acquires the speed Vr of the following other vehicle. Here, the following other vehicle is the vehicle 303. The control unit 200 acquires the speeds of the preceding other vehicle and the following other vehicle using, for example, the outside recognition camera 207 and the outside recognition sensor 208.

In step S204, the control unit 200 initializes the variable S (virtual position S) representing a virtual position (future position) upon estimating that the self-vehicle 301 has made a lane change to the adjacent lane. The position 306 in FIG. 3 represents one of virtual positions to be used in the processing shown in FIG. 8. The initial value of the virtual position S is, for example, a position 1 m behind the vehicle 304 (S=1).

In step S205, the control unit 200 acquires an IDM value βf of the self-vehicle 301 at the virtual position S with respect to the preceding other vehicle. In step S205, the control unit 200 creates an IDM model based on, for example, the speed after deceleration for the lane change of the self-vehicle 301, obtains the IDM value βf from the relative speed and the inter-vehicle distance between the preceding other vehicle and the self-vehicle 301 at the virtual position S, and holds it in the storage area in association with the virtual position S.

In step S206, the control unit 200 acquires an IDM value βr of the following other vehicle with respect to the self-vehicle 301 at the virtual position S. In step S206, the control unit 200 creates an IDM model based on, for example, the speed of the vehicle 303, obtains the IDM value βr from the relative speed and the inter-vehicle distance between the self-vehicle 301 at the virtual position S and the following other vehicle, and holds it in the storage area in association with the virtual position S.

In step S207, the control unit 200 updates the virtual position S. The virtual position S may be, for example, incremented one by one. In step S208, the control unit 200 determines whether a predetermined condition is satisfied, for example, whether the updated virtual position S satisfies "S≤L−1". Here, L corresponds to the inter-vehicle distance 308 shown in FIG. 3. Upon determining that a predetermined condition is satisfied, the process advances to step S209. Upon determining that a predetermined condition is not satisfied, processing from step S205 is repeated.

In step S209, the control unit 200 specifies, as the LC possible space 314, a space including spaces 317 and 318 in which both the accelerations/decelerations βf and βr obtained for each virtual position S have a magnitude equal to or less than a predetermined value (for example, 0.2 or less). That is, when the search processing β in FIG. 8 ends, a space in which the acceleration/deceleration has a predetermined value or less when decelerating and then making a lane change can be specified. After step S209, the processing (search processing β) shown in FIG. 8 is ended.

Referring back to FIG. 6, after steps S103 and S104, the process advances to step S105. In step S105, the control unit 200 determines whether the LC possible space in which the magnitude of the acceleration/deceleration is equal to or less than a predetermined value is specified in both the search processing α and the search processing β. Upon determining that the LC possible space in which the magnitude of the acceleration/deceleration is equal to or less than a predetermined value is specified in both the search processing α and the search processing β, the process advances to step S107. On the other hand, upon determining that it is not so, in step S106, the control unit 200 determines whether the LC possible space in which the magnitude of the acceleration/deceleration is equal to or less than a predetermined value is specified in one of the search processing α and the search processing β. Upon determining that the LC possible space in which the magnitude of the acceleration/deceleration is equal to or less than a predetermined value is specified in one of the search processing α and the search processing β, the processing shown in FIG. 6 is ended, and intention estimation processing of the following other vehicle is performed. The intention estimation processing of the following other vehicle will be described later. On the other hand, upon determining that it is not so, the processes of steps S103 and S104 are performed again.

Upon determining that the LC possible space in which the magnitude of the acceleration/deceleration is equal to or less than a predetermined value is specified in both the search processing α and the search processing β, in step S107, the control unit 200 determines whether a preceding other vehicle and a following other vehicle exist on the self-lane. Processing performed upon determining that a preceding other vehicle and a following other vehicle exist will be described later with reference to FIG. 7. Note that since the scene shown in FIG. 3 indicates a case in which a preceding other vehicle and a following other vehicle do not exist on the self-lane, the process advances from step S107 to step S108.

In step S108, the control unit 200 evaluates the LC possible space 313 specified by the search processing α and the LC possible space 314 specified by the search processing β.

Figure 11:
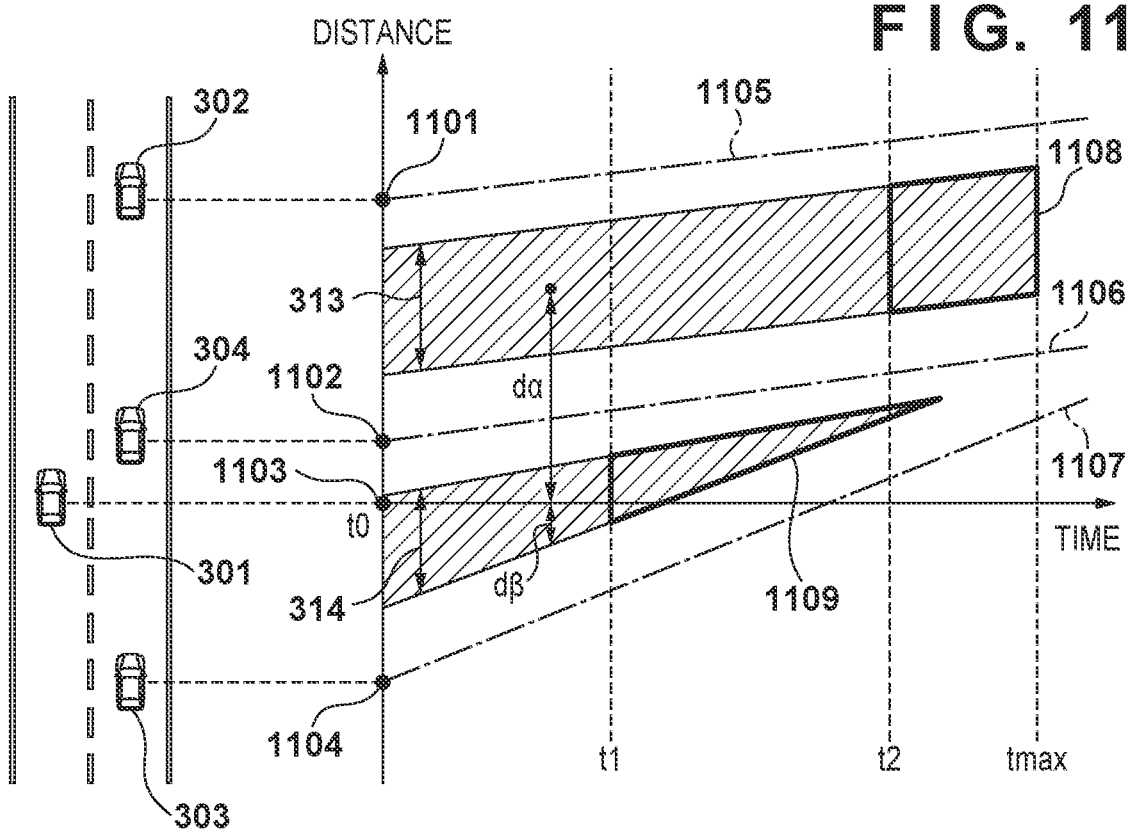
FIG. 11 is a view for explaining evaluation of an LC possible space.

Evaluation of an LC possible space performed in step S108 will be described here. FIG. 11 is a view for explaining evaluation of an LC possible space. The left portion of FIG. 11 corresponds to the scene shown in FIG. 3. The right portion of FIG. 11 shows a time-rate change in the positional relationship between the vehicles 302, 303, and 304 predicted by the control unit 200 based on Vf, Vs, and Vr. That is, since a relationship of Vf=Vs<Vr holds, as indicated by graphs 1105, 1106, and 1107 in FIG. 11, the inter-vehicle distance between the vehicle 304 and the vehicle 303 decreases along with the elapse of time. Points 1101, 1102, and 1104 correspond to the vehicles 302, 304, and 303, respectively, and a point 1103 corresponds to the self-vehicle 301. Hence, the distance between the points 1101 and 1102 corresponds to the inter-vehicle distance 307, and the distance between the points 1102 and 1104 corresponds to the inter-vehicle distance 308.

In FIG. 11, the hatching region between the graph 1105 and the graph 1106 corresponds to the time integration value of the LC possible space 313. In addition, the hatching region between the graph 1106 and the graph 1107 corresponds to the time integration value of the LC possible space 314. Furthermore, t1 on the time base represents a lane change start timing when it is estimated that the self-vehicle 301 performs a rear lane change. Also, t2 on the time base represents a lane change start timing when it is estimated that the self-vehicle 301 performs a front lane change. Here, the lane change start timing is a timing at which the self-vehicle 301 moves across the lane (white line or the like) with respect to the adjacent lane, and is a timing decided from the turn signal lighting timing. For example, it may be a timing obtained by adding 3 sec (a predetermined standby time from turn signal lighting to the start of the lane change) from lighting of the turn signal and further adding a time (until reaching the white line) for the lane change. The time for the lane change may be calculated based on the distance from the self-vehicle 301 to the middle point between the vehicle 302 and the vehicle 304 and the speed of the self-vehicle 301 after acceleration. Alternatively, the time may be calculated based on the distance from the self-vehicle 301 to the middle point between the vehicle 304 and the vehicle 303 and the speed of the self-vehicle 301 after deceleration.

In the case shown in FIG. 3, since the self-vehicle 301 is located slightly behind the vehicle 304, the timing of starting the rear lane change is earlier than the timing of starting the front lane change. In addition, tmax on the time base is the limit time from lighting of the turn signal to the lane change end, and is, for example, a timing obtained by adding 10 sec from lighting of the turn signal.

A hatching region 1108 represents a time integration value $S\alpha$ of the LC possible space 313 from the start of the front lane change by the self-vehicle 301 (time t2) to the time tmax. A hatching region 1109 represents a time integration value $S\beta$ of the LC possible space 314 from the start of the rear lane change by the self-vehicle 301 (time t1) until the hatching region 1109 disappears.

As shown in FIG. 11, since the speed Vf of the vehicle 302 and the speed Vs of the vehicle 304 almost equal, the hatching region 1108 is maintained until the time tmax. On the other hand, since the speed Vr of the vehicle 303 is higher than the speed Vs of the vehicle 304, the hatching region 1109 decreases along with the elapse to time and disappears until the time tmax. That is, when performing the rear lane change, the lane change start timing can be made earlier than in a case of performing the front lane change. However, since the LC possible space may disappear, the flow of whole traffic may be impeded. On the other hand, when performing the front lane change, the LC possible space is maintained as compared to a case of performing the rear lane change, but the lane change start timing becomes later.

In this embodiment, the time integration value S ($S\alpha$, $S\beta$) is evaluated using $$\text{Evaluation function } f = (w1/d) \times (w2 \times S) \times (w3 \times S'(t)) \qquad (2)$$

Here, the moving distance of the self-vehicle 301 makes a contribution in the first term of the right-hand side, the area S (time integration value) of the LC possible space makes a contribution in the second term, and the time change amount of the area S makes a contribution in the third term. d is the distance from the self-vehicle 301 to the middle point in each of the inter-vehicle distances 307 and 308 ($d\alpha$, $d\beta$). w1, w2, and w3 are arbitrary parameters, and the degree of importance of each of the moving distance d, the area S of the LC possible space, and the time change amount S'(t) of the area can be set in accordance with, for example, a scene.

The time change amount of the area S may be obtained as follows for Sb in a predetermined time interval, that is, t0 to tb (t1<tb) and Sa in t0 to ta (t1<ta<tb).

$$S'(t) = (Sb - Sa)/(tb - ta) \qquad (3)$$

The first term of the right side of equation (3) represents $\Delta S$, and the second term represents $\Delta t$.

As indicated by equation (2), the larger d is, the smaller the evaluation value is, and the smaller d is, the larger the evaluation value is. This shows that the longer the moving distance to make a lane change is, the smaller the evaluation value is, and the shorter the moving distance is, the larger the evaluation value is. In addition, the larger S is, the larger the evaluation value is, and the smaller S is, the smaller the evaluation value is. This shows that the larger the LC possible space is, the larger the evaluation value is, and the smaller the LC possible space is, the smaller the evaluation value is. Also, the larger S'(t) is, the larger the evaluation value is, and the smaller S'(t) is, the smaller the evaluation value is. This shows that the larger the LC possible space becomes along with the elapse of time, the larger the evaluation value is, and the smaller the LC possible space becomes along with the elapse of time, the smaller the evaluation value is.

Referring back to FIG. 6, when the evaluation values are calculated for the LC possible spaces 313 and 314 in step S108, in step S109, the control unit 200 selects the LC possible space of the larger evaluation value as a lane change execution target. In step S110, the control unit 200 decides an LC position to enter the selected LC possible space. For example, the control unit 200 may decide the intermediate position of the selected LC possible space as the LC position. In step S111, the control unit 200 controls the self-vehicle 301 to do a lane change to the decided LC position. After step S111, the processing shown in FIG. 6 is ended.

Figure 13:
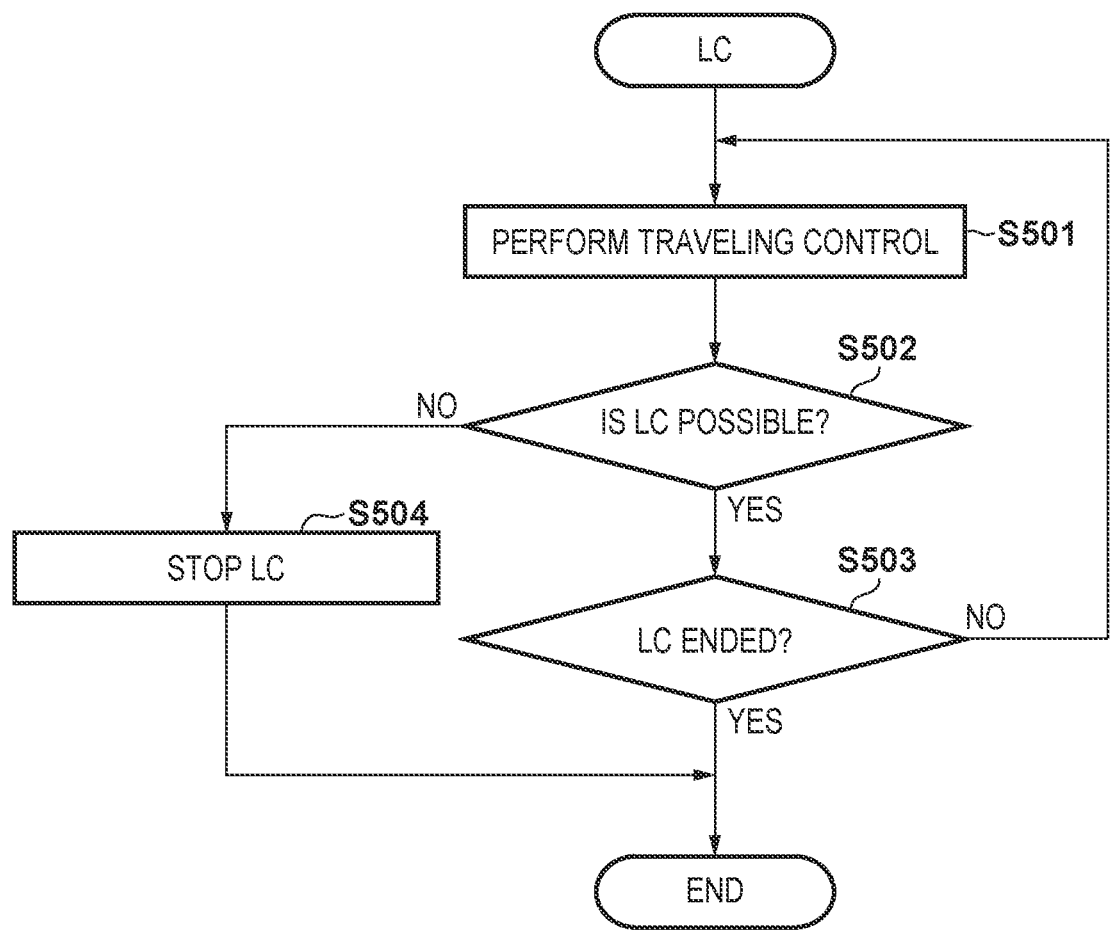
FIG. 13 is a flowchart showing processing of a lane change.

FIG. 13 is a flowchart showing the process of step S111. In step S501, the control unit 200 controls the traveling of the self-vehicle 301 to the LC position decided in step S110. At this time, traveling of the self-vehicle 301 is controlled such that the process is performed within a predetermined time from lighting of the turn signal in step S101. The predetermined time is, for example, a time of 10 sec from lighting of the turn signal to the lane change end.

In step S502, the control unit 200 determines whether a lane change is possible. The control unit 200 determines whether the magnitude of the acceleration/deceleration applied to the self-vehicle 301 by the influence of the preceding other vehicle has become larger than a predetermined value. In addition, the control unit 200 determines whether the magnitude of the acceleration/deceleration applied to the following other vehicle by the influence exerted on the following other vehicle has become larger than a predetermined value. Upon determining, in one of the two above-described determinations, that the magnitude of the acceleration/deceleration has become larger than a predetermined value, the control unit 200 determines that a lane change is not possible. In step S504, the lane change is stopped, and the processes shown in FIGS. 13 and 6 are ended.

On the other hand, upon determining, in both of the two above-described determinations, that the magnitude of the acceleration/deceleration has not become larger than a predetermined value, the control unit 200 determines in step S503 whether traveling control of the lane change has ended. In step S503, the control unit 200 makes the determination based on whether the self-vehicle 301 has reached the LC position decided in step S110. Upon determining that traveling control of the lane change has ended, the processes shown in FIGS. 13 and 6 are ended. On the other hand, upon determining that traveling control of the lane change has not ended, processing from step S501 is repeated.

Figure 4:
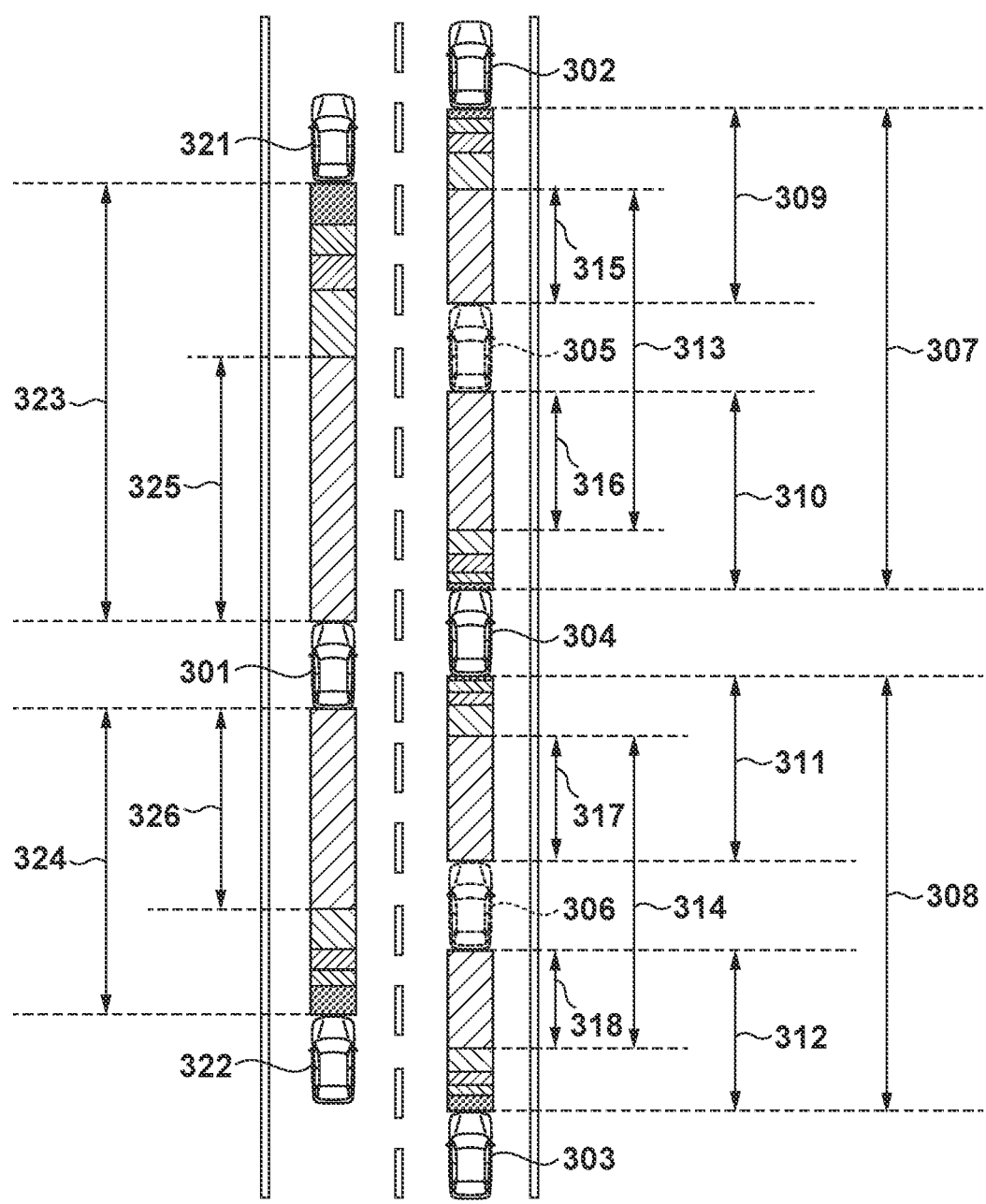
FIG. 4 is a view for explaining an entering operation between vehicles by a lane change.

A case in which it is determined in step S107 of FIG. 6 that a preceding other vehicle and a following other vehicle exist on the self-lane will be described below. FIG. 4 is a view showing an example of a scene in a case in which it is determined that a preceding other vehicle and a following other vehicle exist on the self-lane. As shown in FIG. 4, a vehicle 321 is traveling at a speed Vf0 ahead the self-vehicle 301. The vehicle 321 corresponds to the above-described preceding other vehicle. In addition, a vehicle 322 is traveling at a speed Vr0 behind the self-vehicle 301. The vehicle 322 corresponds to the above-described following other vehicle. An inter-vehicle distance 323 is the inter-vehicle distance between the vehicle 321 and the self-vehicle 301, and an inter-vehicle distance 324 is the inter-vehicle distance between the self-vehicle 301 and the vehicle 322.

Figure 7:
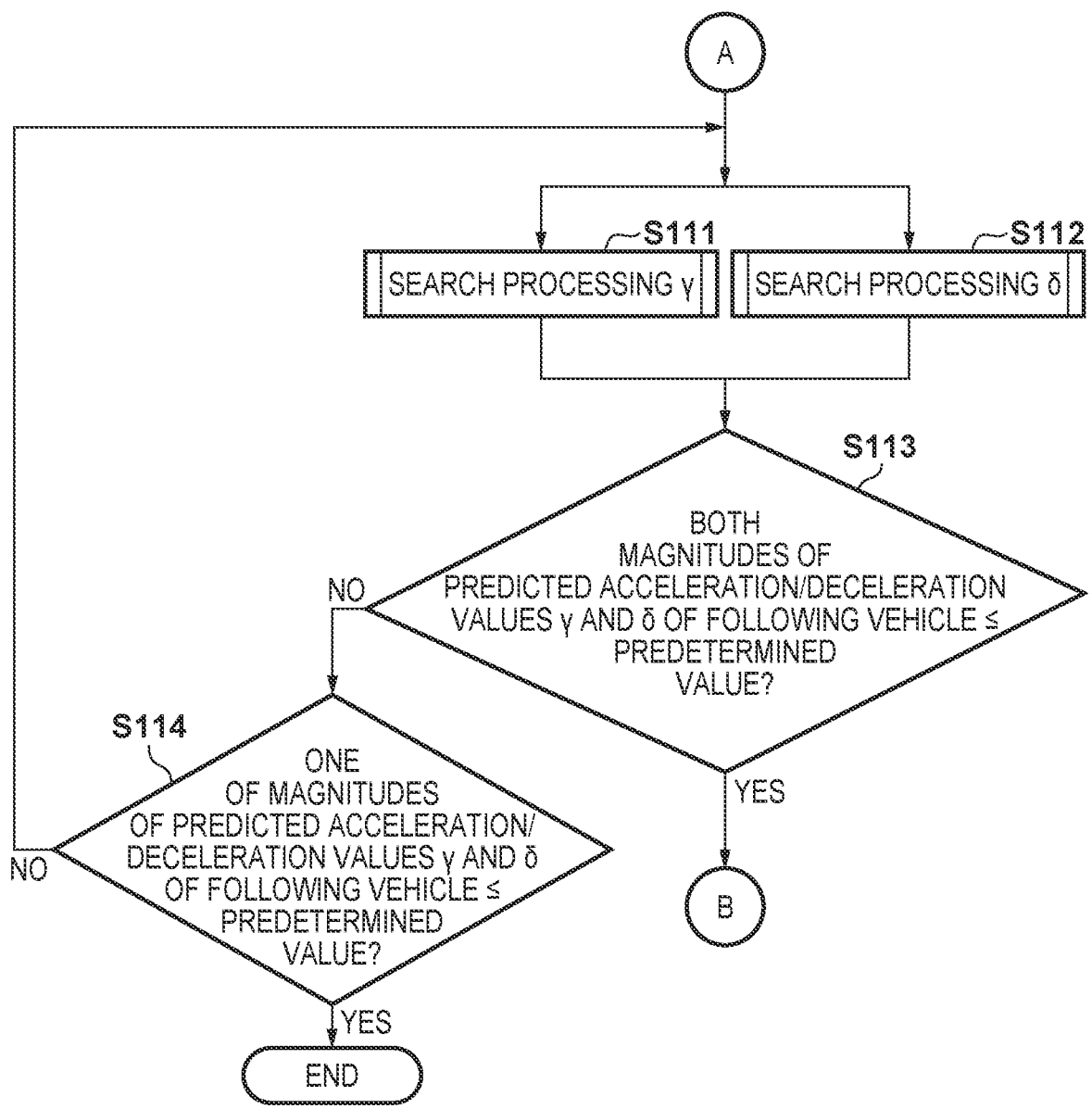
FIG. 7 is a flowchart showing processing of a lane change.

Upon determining in step S107 that a preceding other vehicle and a following other vehicle exist on the self-lane, the processes of steps S111 and S112 in FIG. 7 are executed. In step S111, search processing γ for searching for an LC possible space 325 is performed. In step S112, search processing δ for searching for an LC possible space 326 is performed. Note that in this embodiment, a description will be made assuming that the search processing γ of step S111 and the search processing δ of step S112 are performed in parallel. However, the search processing δ may be performed after the search processing γ, or the search processing γ may be performed after the search processing δ.

Figure 9:
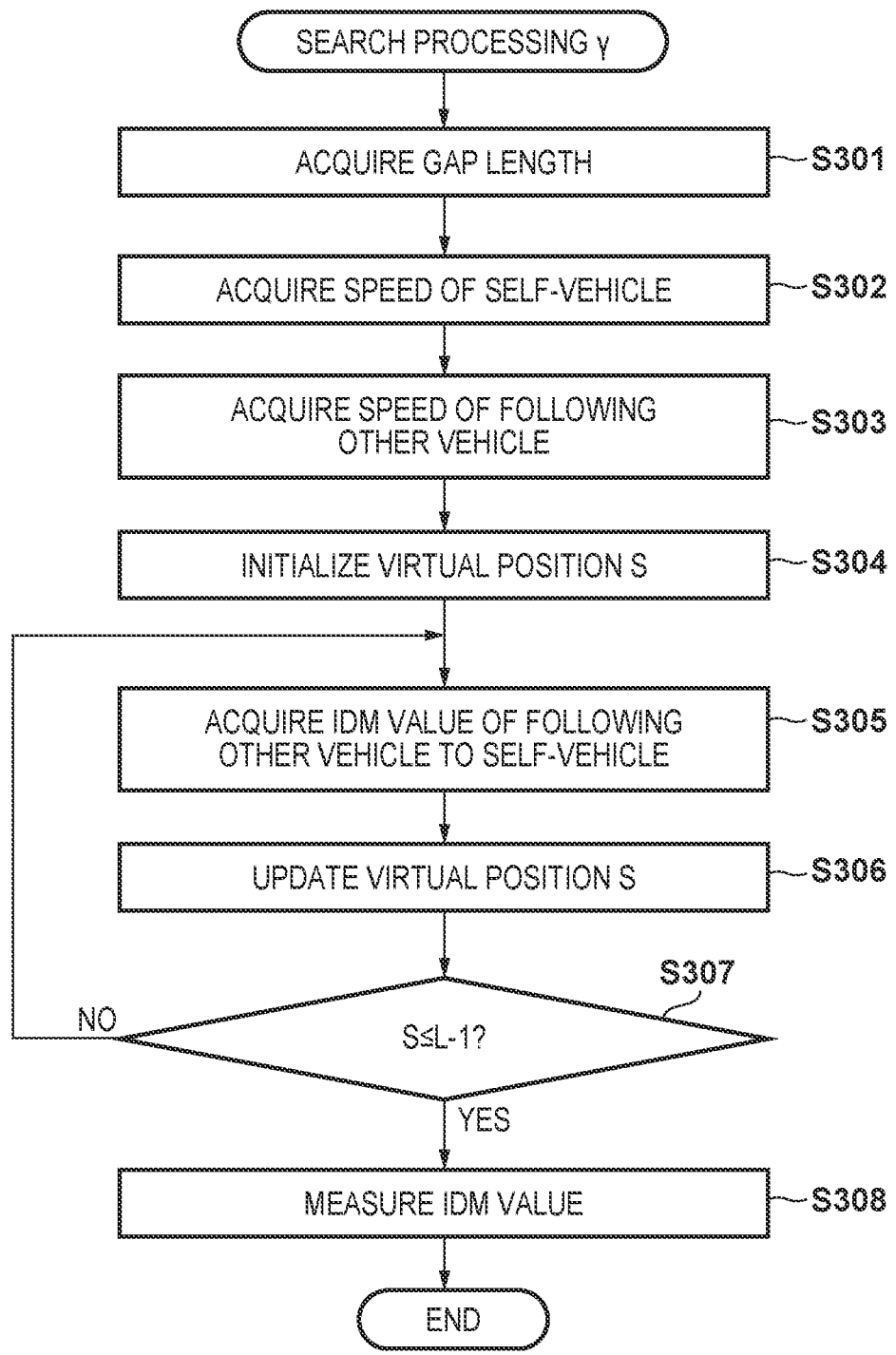
FIG. 9 is a flowchart showing search processing.

FIG. 9 is a flowchart showing the search processing γ of step S111. In step S301, the control unit 200 acquires a gap length. Here, the gap length corresponds to the inter-vehicle distance 324 in FIG. 4. Note that in this embodiment, the inter-vehicle distances 323 and 324 and the LC possible spaces 325 and 326 represent distances along the traveling lane.

In step S302, the control unit 200 acquires the speed V0 of the self-vehicle 301. The speed V0 acquired here is the speed after deceleration for the lane change. In step S303, the control unit 200 acquires the speed Vr0 of the following other vehicle. Here, the following other vehicle is the vehicle 322. The control unit 200 acquires the speed of the following other vehicle using, for example, the outside recognition camera 207 and the outside recognition sensor 208.

In step S304, the control unit 200 initializes the variable S (virtual position S) representing the virtual position (future position) of the self-vehicle 301 in the inter-vehicle distance 324. The initial value of the virtual position S is, for example, a position 1 m ahead the vehicle 322 (S=1).

In step S305, the control unit 200 acquires an IDM value γ of the following other vehicle with respect to the self-vehicle 301 at the virtual position S. In step S305, the control unit 200 creates an IDM model based on, for example, the speed of the vehicle 322, obtains the IDM value γ from the relative speed and the inter-vehicle distance between the self-vehicle 301 at the virtual position S and the following other vehicle, and holds it in the storage area in association with the virtual position S.

In step S306, the control unit 200 updates the virtual position S. The virtual position S may be, for example, incremented one by one. In step S307, the control unit 200 determines whether a predetermined condition is satisfied, for example, whether the updated virtual position S satisfies "S≤L−1". Here, L corresponds to the inter-vehicle distance 324 shown in FIG. 4. Upon determining that a predetermined condition is satisfied, the process advances to step S308. Upon determining that a predetermined condition is not satisfied, processing from step S305 is repeated.

In step S308, the control unit 200 specifies, as the LC possible space 326, a space in which the acceleration/deceleration γ obtained for each virtual position S has a magnitude equal to or less than a predetermined value (for example, 0.2 or less). That is, when the search processing γ in FIG. 9 ends, a space in which the magnitude of the acceleration/deceleration has a predetermined value or less can be specified behind the self-vehicle 301 when decelerating and then making a lane change. After step S308, the processing shown in FIG. 9 is ended.

Figure 10:
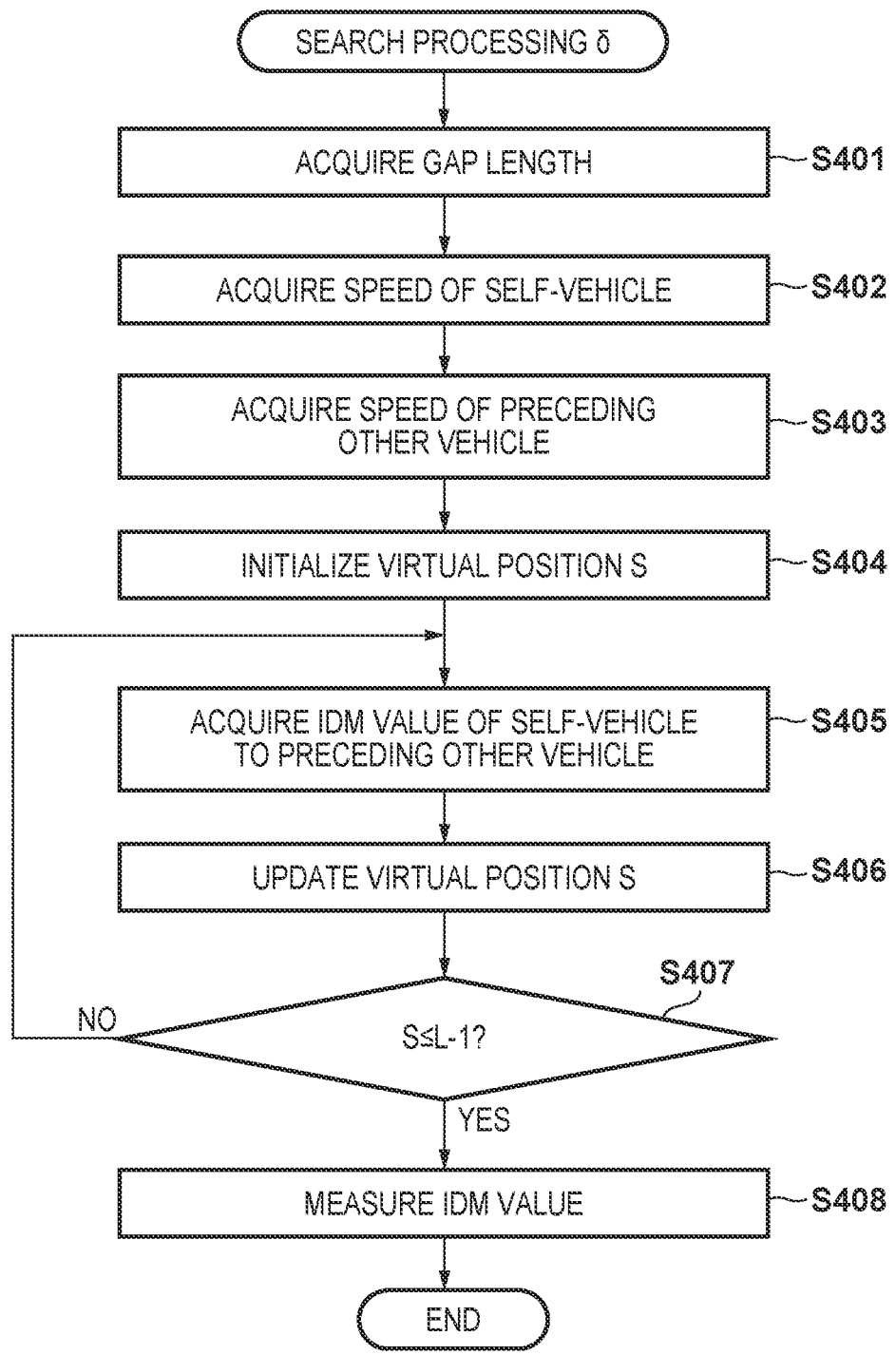
FIG. 10 is a flowchart showing search processing.

FIG. 10 is a flowchart showing the search processing δ of step S112. In step S401, the control unit 200 acquires a gap length. Here, the gap length corresponds to the inter-vehicle distance 323 in FIG. 4.

In step S402, the control unit 200 acquires the speed V0 of the self-vehicle 301. The speed V0 acquired here is the speed after acceleration for the lane change. In step S403, the control unit 200 acquires the speed Vf0 of the preceding other vehicle. Here, the preceding other vehicle is the vehicle 321. The control unit 200 acquires the speed of the preceding other vehicle using, for example, the outside recognition camera 207 and the outside recognition sensor 208.

In step S404, the control unit 200 initializes the variable S (virtual position S) representing the virtual position (future position) of the self-vehicle 301 in the inter-vehicle distance 323. The initial value of the virtual position S is, for example, a position 1 m behind the vehicle 321 (S=1).

In step S405, the control unit 200 acquires an IDM value δ of the self-vehicle 301 at the virtual position S with respect to the preceding other vehicle. In step S405, the control unit 200 creates an IDM model based on, for example, the speed of the self-vehicle 301 at the virtual position S, obtains the IDM value δ from the relative speed and the inter-vehicle distance between the preceding other vehicle and the self-vehicle 301 at the virtual position S, and holds it in the storage area in association with the virtual position S.

In step S406, the control unit 200 updates the virtual position S. The virtual position S may be, for example, incremented one by one. In step S407, the control unit 200 determines whether a predetermined condition is satisfied, for example, whether the updated virtual position S satisfies "S≤L−1". Here, L corresponds to the inter-vehicle distance 323 shown in FIG. 4. Upon determining that a predetermined condition is satisfied, the process advances to step S408. Upon determining that a predetermined condition is not satisfied, processing from step S405 is repeated.

In step S408, the control unit 200 specifies, as the LC possible space 325, a space in which the acceleration/deceleration δ obtained for each virtual position S has a magnitude equal to or less than a predetermined value (for example, 0.2 or less). That is, when the search processing δ in FIG. 10 ends, a space in which the magnitude of the acceleration/deceleration has a predetermined value or less can be specified ahead the self-vehicle 301 when accelerating and then making a lane change. After step S408, the processing shown in FIG. 10 is ended.

Referring back to FIG. 7, after steps S111 and S112, the process advances to step S113. In step S113, the control unit 200 determines whether the LC possible space in which the magnitude of the acceleration/deceleration is equal to or less than a predetermined value is specified in both the search processing γ and the search processing δ. Upon determining that the LC possible space in which the magnitude of the acceleration/deceleration is equal to or less than a predetermined value is specified in both the search processing γ and the search processing δ, the process advances to step S108 in FIG. 6. On the other hand, upon determining that it is not so, in step S114, the control unit 200 determines whether the LC possible space in which the magnitude of the acceleration/deceleration is equal to or less than a predetermined value is specified in one of the search processing γ and the search processing δ. Upon determining that the LC possible space in which the magnitude of the acceleration/deceleration is equal to or less than a predetermined value is specified in one of the search processing γ and the search processing δ, the processing shown in FIG. 7 is ended, and intention estimation processing of the following other vehicle is performed. The intention estimation processing of the following other vehicle will be described later. On the other hand, upon determining that it is not so, the processes of steps S111 and S112 are performed again.

Upon determining that the LC possible space in which the magnitude of the acceleration/deceleration is equal to or less than a predetermined value is specified in both the search processing γ and the search processing δ, in step S108, the control unit 200 evaluates the LC possible space 313 specified by the search processing α and the LC possible space 314 specified by the search processing β in consideration of the LC possible spaces 325 and 326 specified by the search processing γ and the search processing δ.

Figure 12:
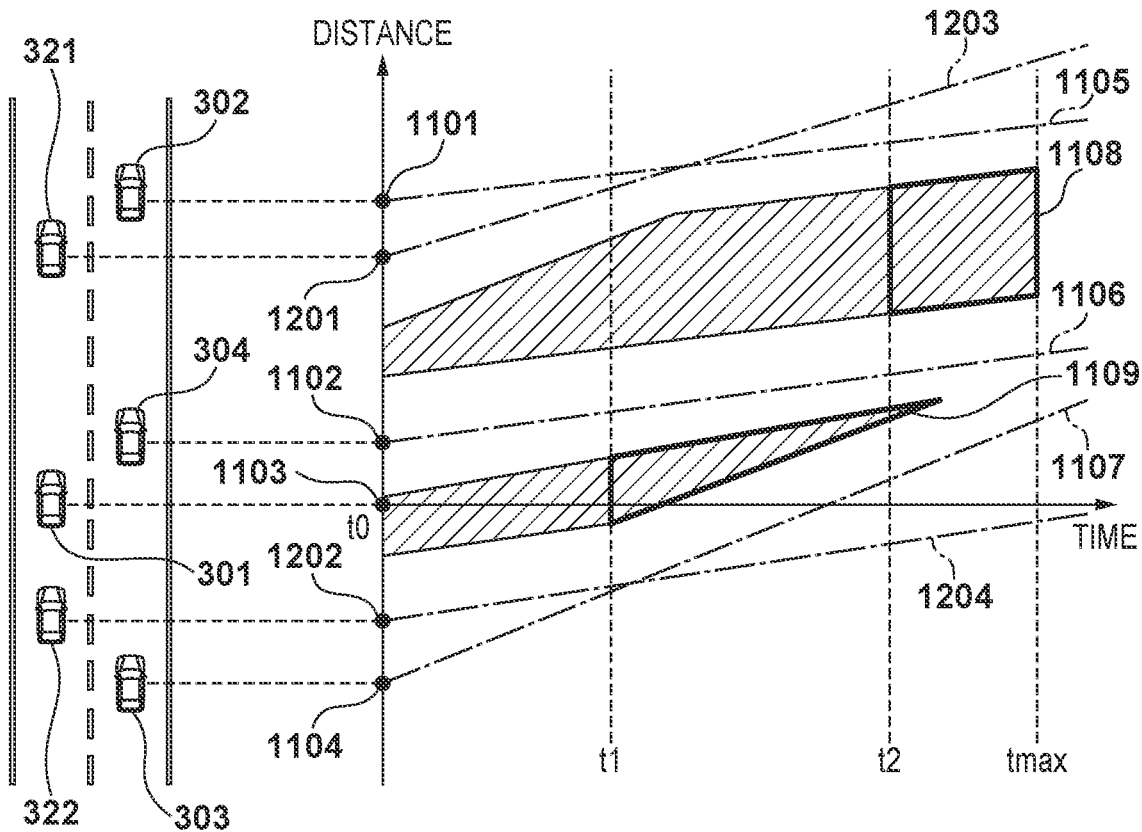
FIG. 12 is a view for explaining evaluation of an LC possible space.

Evaluation of an LC possible space performed in step S108 will be described here. FIG. 12 is a view for explaining evaluation of an LC possible space. The left portion of FIG. 12 corresponds to the scene shown in FIG. 4. The right portion of FIG. 12 shows a time-rate change in the positional relationship between the vehicles 302, 303, 304, 321, and 322 predicted by the control unit 200 based on Vf, Vs, Vr, Vf0, and Vr0. That is, relationships given by Vf0>Vf, and Vr0<Vr hold, as indicated by a graph 1203 in FIG. 12. Points 1201 and 1202 correspond to the vehicles 321 and 322, respectively, and the point 1103 corresponds to the self-vehicle 301. Hence, the distance between the points 1201 and 1103 corresponds to the inter-vehicle distance 323, and the distance between the points 1103 and 1202 corresponds to the inter-vehicle distance 324.

In FIG. 12, the hatching region between the graph 1105 and the graph 1106 corresponds to the time integration value of the LC possible space 313. However, due to the influence of the vehicle 321, the shape of the hatching is cut near the times t0 to t1 as compared to FIG. 11. This is because the magnitude of the acceleration/deceleration received by the self-vehicle 301 becomes larger than a predetermined value in a portion other than the LC possible space 325 within the inter-vehicle distance 323, and therefore, even a part of the LC possible space 313 needs to be excluded from the target of evaluation. In addition, the hatching region between the graph 1106 and the graph 1107 corresponds to the time integration value of the LC possible space 314. However, due to the influence of the vehicle 322, the shape of the hatching is cut near the times t0 to t1 as compared to FIG. 11. This is because the magnitude of the acceleration/deceleration applied to the vehicle 322 becomes larger than a predetermined value in a portion other than the LC possible space 326 within the inter-vehicle distance 324, and therefore, even a part of the LC possible space 314 needs to be excluded from the target of evaluation.

The processing is the same as in FIG. 11 except the above-described point, and the LC possible space 313 specified by the search processing α and the LC possible space 314 specified by the search processing β are evaluated using equation (2), as already described.

In FIG. 12, since the middle point of the inter-vehicle distance 308 is located almost at the center of the hatching region at the time t1, evaluation is performed as in the case of FIG. 11. If the shape of the hatching region is cut due to the influence of the vehicle 321, the middle point of the inter-vehicle distance 308 may be deviated from the hatching region or located near the boundary. In this case, the axis of the time t1 may be changed to a position where the middle point of the inter-vehicle distance 308 is included in the vicinity of the center of the hatching region. The axis of the time t2 may also be changed in a similar manner.

When the evaluation values are calculated for the LC possible spaces 313 and 314 in step S108, in step S109, the control unit 200 selects the LC possible space of the larger evaluation value as a lane change execution target. In step S110, the control unit 200 decides an LC position to enter the selected LC possible space. For example, the control unit 200 decides, as the LC position, a position to enter the LC possible space 313 in a shortest distance from the position of the self-vehicle 301. For example, if the LC possible space 325 is included in the LC possible space 313, a position translated to the adjacent lane ahead of the self-vehicle 301 by the vehicle length is decided as the LC position. In step S111, the control unit 200 controls the self-vehicle 301 to do a lane change to the decided LC position. The processing at this time is performed as shown in FIG. 13. After step S111, the processing shown in FIG. 6 is ended.

Intention estimation processing of the following other vehicle will be described below. This processing is performed when it is determined in step S102 of FIG. 6 that a parallel traveling other vehicle does not exist, when it is determined in step S106 of FIG. 6 that the LC possible space in which the magnitude of the acceleration/deceleration is equal to or less than a predetermined value is specified in one of the search processing α and the search processing β, or when it is determined in step S114 of FIG. 7 that the LC possible space in which the magnitude of the acceleration/deceleration is equal to or less than a predetermined value is specified in one of the search processing γ and the search processing δ.

In the intention estimation processing of the following other vehicle, for example, when the self-vehicle 301 lights a turn signal for a lane change to show an intention to change the lane, the presence/absence of an intention of the following other vehicle on the adjacent lane to give the way to the self-vehicle 301 is estimated. For example, even if the self-vehicle 301 has lighted the turn signal, and the following other vehicle has then decelerated, the following other vehicle may have decelerated merely because of the deceleration of the preceding other vehicle on the adjacent lane. In this case, it is estimated that the following other vehicle has no intention to give the way to the self-vehicle 301. In this embodiment, the presence/absence of the intention of the following other vehicle to give the way to the self-vehicle is thus estimated based on the behavior of the following other vehicle to the self-vehicle 301 and the behavior of the following other vehicle to the preceding other vehicle. Note that "give way" is used in a sense of allowing the self-vehicle 301 to change the lane and enter an inter-vehicle region in front of the following other vehicle.

If it is determined in step S102 of FIG. 6 that a parallel traveling other vehicle does not exist, the self-vehicle 301 estimates the presence/absence of an intention of the following other vehicle to give the way to the self-vehicle 301 by intention estimation processing. If it is determined in step S106 of FIG. 6 that the LC possible space in which the magnitude of the acceleration/deceleration is equal to or less than a predetermined value is specified in one of the search processing α and the search processing β, a lane change is performed using the specified LC possible space as a target. At this time, the self-vehicle 301 estimates the presence/absence of an intention of the following other vehicle to give the way to the self-vehicle 301 by intention estimation processing. If it is determined in step S114 of FIG. 7 that the LC possible space in which the magnitude of the acceleration/deceleration is equal to or less than a predetermined value is specified in one of the search processing γ and the search processing δ, a lane change is performed via the specified LC possible space. At this time, the self-vehicle 301 estimates the presence/absence of an intention of the following other vehicle to give the way to the self-vehicle 301 by intention estimation processing.

Figure 14:
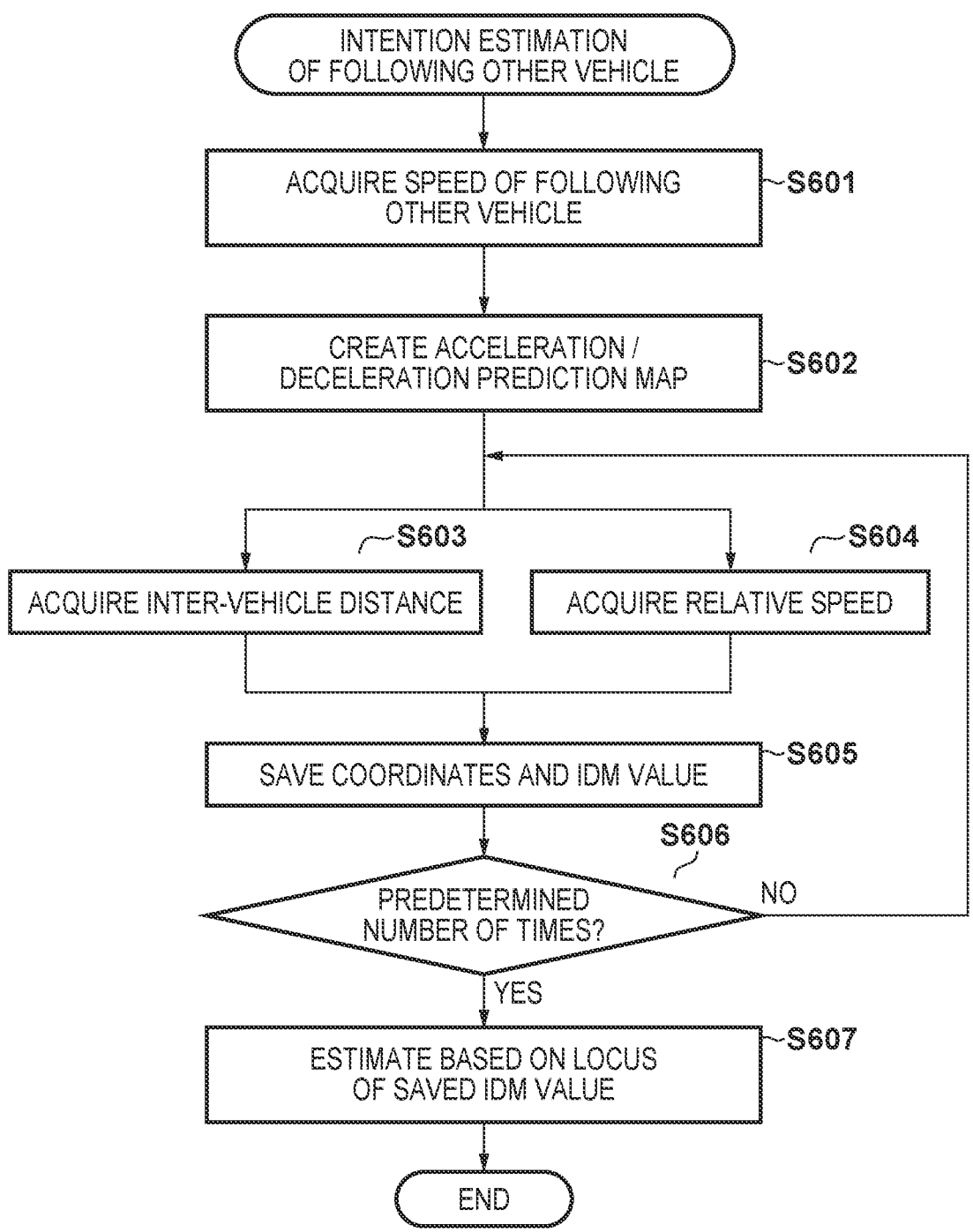
FIG. 14 is a flowchart showing processing of intention estimation of following other vehicle.

FIG. 14 is a flowchart showing intention estimation processing of the following other vehicle. Processing shown in FIG. 14 is implemented when, for example, the control unit 200 of the self-vehicle 301 reads out a program stored in a storage area such as a ROM and executes it. A description will be made below by referring to the control unit 200 of the self-vehicle 301 simply as the control unit 200 unless specified otherwise.

In step S601, the control unit 200 acquires the speed of the following other vehicle. The control unit 200 acquires the speed of the following other vehicle on the adjacent lane using, for example, the outside recognition camera 207 or the outside recognition sensor 208. In step S602, the control unit 200 creates an acceleration/deceleration prediction map as shown in FIG. 5 based on the speed of the following other vehicle 303 acquired in step S601.

In this embodiment, on the acceleration/deceleration prediction map created in step S602, the locus of a point corresponding to the relative speed and the inter-vehicle distance between the self-vehicle 301 and the following other vehicle and the locus of a point corresponding to the relative speed and the inter-vehicle distance between the following other vehicle and the preceding other vehicle on the adjacent lane are determined. The presence/absence of an intention of the following other vehicle to give way is estimated based on the determined loci.

In step S603, the control unit 200 acquires the inter-vehicle distance between the self-vehicle 301 and the following other vehicle and the inter-vehicle distance between the following other vehicle and the preceding other vehicle. In step S604, the control unit 200 acquires the relative speed between the self-vehicle 301 and the following other vehicle and the relative speed between the following other vehicle and the preceding other vehicle.

In step S605, the control unit 200 plots a first point corresponding to the relative speed and the inter-vehicle distance between the self-vehicle 301 and the following other vehicle on the acceleration/deceleration prediction map created in step S602, and saves the coordinates of the point and an acceleration/deceleration as its IDM value. Also, in step S605, the control unit 200 plots a second point corresponding to the relative speed and the inter-vehicle distance between the following other vehicle and the preceding other vehicle on the acceleration/deceleration prediction map created in step S602, and saves the coordinates of the point and an acceleration/deceleration as its IDM value.

In step S606, the control unit 200 determines whether the process of step S605 has been executed a predetermined number of times. Upon determining that the process has not been executed a predetermined number of times, the processes of steps S603 to S605 are repeated. On the other hand, upon determining that the process of step S605 has been executed a predetermined number of times, in step S607, the control unit 200 estimates, based on the locus of the first point in the predetermined number of times of processes and the locus of the second point in the predetermined number of times of processes, the presence/absence of an intention of the following other vehicle to give way.

Estimation of the presence/absence of an intention of the following other vehicle to give way in step S607 will be described below using, as an example, a case in which it is determined in step S102 that a parallel traveling other vehicle does not exist.

After the generation of the acceleration/deceleration prediction map in step S602 of FIG. 14, when performing the first processes of steps S603 and S604, the self-vehicle 301, the preceding other vehicle 302, and the following other vehicle 303 are assumed to be traveling at V0=65 km/h, Vf=80 km/h, and Vr=70 km/h, respectively. Note that the predetermined number of times of repeating the processes of steps S603 to S605 is three.

At this time, the relative speed between the self-vehicle 301 and the following other vehicle 303 is 65 km/h−70 km/h=−5 km/h. The inter-vehicle distance between the self-vehicle 301 and the following other vehicle 303 is 30 m. That is, the first point is plotted as indicated by a point 1501 in FIG. 15A. On the other hand, the relative speed between the following other vehicle 303 and the preceding other vehicle 302 is 80 km/h−70 km/h=10 km/h. The inter-vehicle distance between the following other vehicle 303 and the preceding other vehicle 302 is 70 m. That is, the second point is plotted as indicated by a point 1502 in FIG. 15A.

When performing the second processes of steps S603 and S604, the self-vehicle 301, the preceding other vehicle 302, and the following other vehicle 303 are assumed to be traveling at V0=65 km/h, Vf=80 km/h, and Vr=65 km/h, respectively.

At this time, the relative speed between the self-vehicle 301 and the following other vehicle 303 is 65 km/h−65 km/h=0 km/h. The inter-vehicle distance between the self-vehicle 301 and the following other vehicle 303 is 35 m. That is, the first point is plotted as indicated by the point 1501 in FIG. 15B. On the other hand, the relative speed between the following other vehicle 303 and the preceding other vehicle 302 is 80 km/h−65 km/h=+15 km/h. The inter-vehicle distance between the following other vehicle 303 and the preceding other vehicle 302 is 80 m. That is, the second point is plotted as indicated by the point 1502 in FIG. 15B.

When performing the third processes of steps S603 and S604, the self-vehicle 301, the preceding other vehicle 302, and the following other vehicle 303 are assumed to be traveling at V0=65 km/h, Vf=80 km/h, and Vr=60 km/h, respectively.

At this time, the relative speed between the self-vehicle 301 and the following other vehicle 303 is 65 km/h−60 km/h=+5 km/h. The inter-vehicle distance between the self-vehicle 301 and the following other vehicle 303 is 40 m. That is, the first point is plotted as indicated by the point 1501 in FIG. 15C. On the other hand, the relative speed between the following other vehicle 303 and the preceding other vehicle 302 is 80 km/h−60 km/h=+20 km/h. The inter-vehicle distance between the following other vehicle 303 and the preceding other vehicle 302 is 90 m. That is, the second point is plotted as indicated by the point 1502 in FIG. 15C.

Figure 15A:
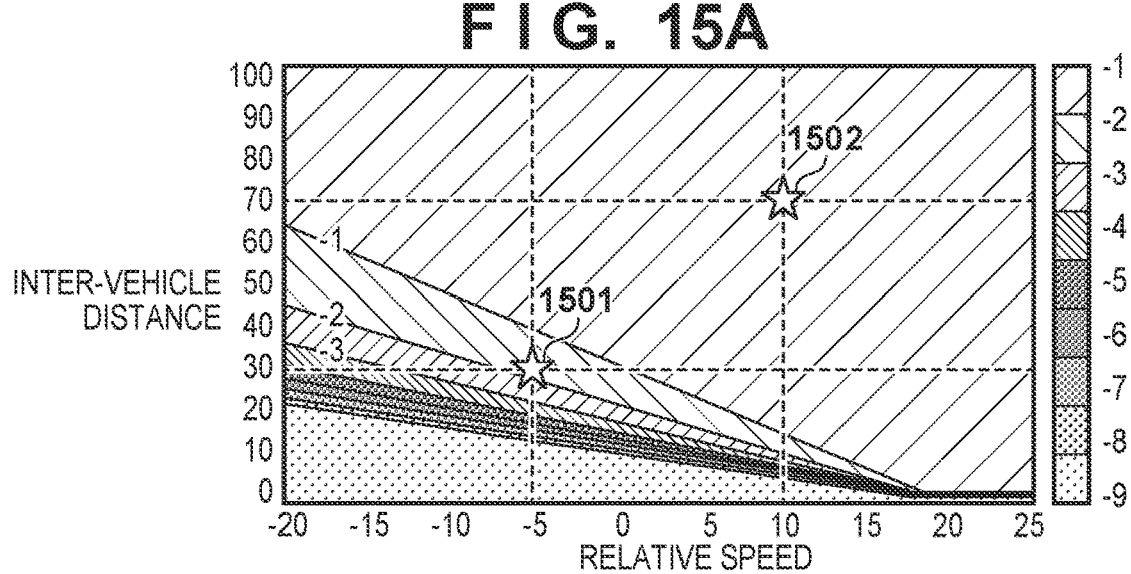
FIGS. 15A, 15B, and 15C are views for explaining intention estimation based on the acceleration/deceleration prediction map.
Figure 15B:
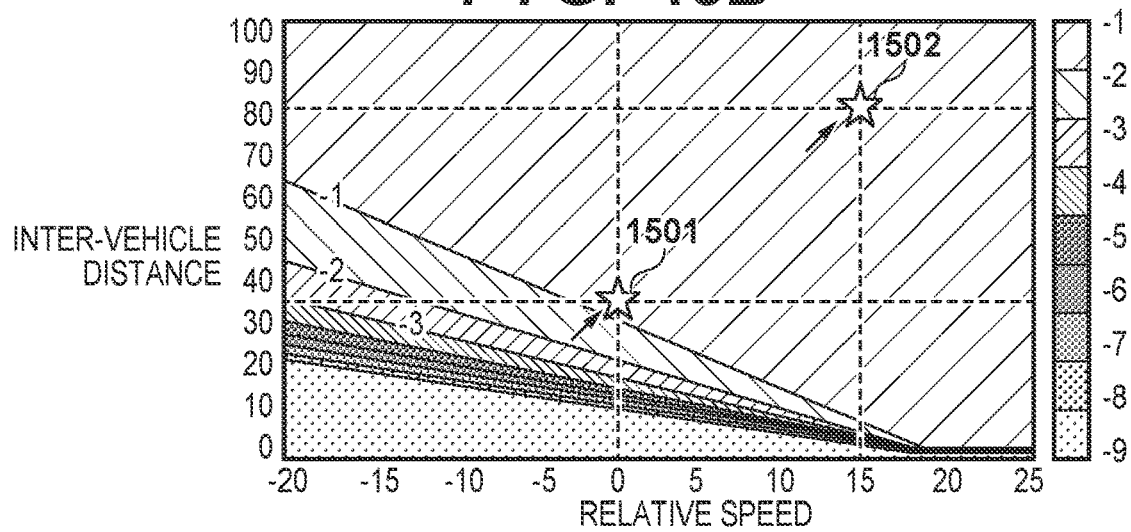
Figure 15C:
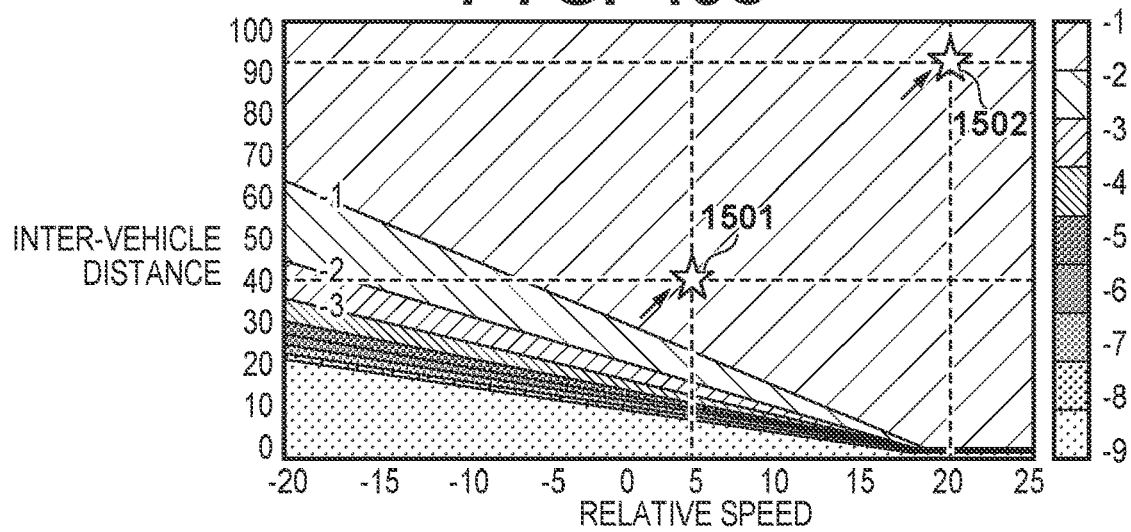

As shown in FIGS. 15A to 15C, focusing on the locus of the saved first point (point 1501), it is found that the point gradually moves to the upper right side. The movement to the upper right side on the acceleration/deceleration prediction map indicates a tendency that both the relative speed and the inter-vehicle distance increase. In other words, it can be said that the movement to the upper right side on the acceleration/deceleration prediction map is a movement in a direction in which the acceleration/deceleration to a partner vehicle decreases. Focusing on the self-vehicle 301 and the following other vehicle 303, it is shown that the speed of the following other vehicle 303 becomes lower than the speed of the self-vehicle 301, and the inter-vehicle distance becomes long.

Focusing on the locus of the saved second point (point 1502), as shown in FIGS. 15A to 15C, it is found that the point gradually moves to the upper right side. The movement to the upper right side on the acceleration/deceleration prediction map indicates a tendency that both the relative speed and the inter-vehicle distance increase. Focusing on the following other vehicle 303 and the preceding other vehicle 302, it is shown that the speed of the following other vehicle 303 becomes lower than the speed of the preceding other vehicle 302, and the inter-vehicle distance becomes long.

Based on the tendencies of the movements of the two points, the control unit 200 of the self-vehicle 301 estimates that the following other vehicle 303 has an intention to give way to the self-vehicle 301. As for the movements of the first point and the second point to the upper right side, which make it possible to estimate that there is an intention to give way, for example, a line near 45° based on the axes of the inter-vehicle distance and the relative speed may be defined as a predetermined moving line. The predetermined moving line may be defined based on the axes and the distribution of accelerations/decelerations. In addition, if the moving amounts of the points 1501 and 1502 on the moving line, that is, the moving amounts in the directions of arrows in FIGS. 15B and 15C are equal to or more than a threshold, it is determined that the points 1501 and 1502 have moved.

The relative relationships (relative distances and relative speeds) between the self-vehicle and the following other vehicle and between the following other vehicle and the preceding other vehicle and an example of the estimation result will be described below.

Case in which Relative Distance and Relative Speed Between Following Other Vehicle and Preceding Other Vehicle Increase (or are Maintained), and Relative Distance and Relative Speed Between Following Other Vehicle and Self-Vehicle Decrease In this case, focusing on the relationship between the following other vehicle and the preceding other vehicle, it is shown that the speed of the following other vehicle becomes lower than the speed of the preceding other vehicle, and the inter-vehicle distance becomes long. From this tendency, there is a possibility that it can be estimated that the following other vehicle has an intention to give way to the self-vehicle. However, focusing on the relationship between the self-vehicle and the following other vehicle, it is shown that the speed of the following other vehicle becomes higher than the speed of the self-vehicle, and the inter-vehicle distance becomes short. As a result, it is estimated in conclusion that the following other vehicle has no intention to give way to the self-vehicle.

Furthermore, in this case, it is shown that the relative distance between the following other vehicle and the preceding other vehicle is maintained, and the relative speed is also maintained. In this case, independently of the relationship between the self-vehicle and the following other vehicle, for example, the driver of the following other vehicle may not be aware of the self-vehicle. Hence, it is estimated in conclusion that the following other vehicle has no intention to give way to the self-vehicle.

Case in which Relative Distance and Relative Speed Between Following Other Vehicle and Preceding Other Vehicle Decrease (or are Maintained), and Relative Distance and Relative Speed Between Following Other Vehicle and Self-Vehicle Increase In this case, focusing on the relationship between the self-vehicle and the following other vehicle, it is shown that the speed of the following other vehicle becomes lower than the speed of the self-vehicle, and the inter-vehicle distance becomes long. From this tendency, there is a possibility that it can be estimated that the following other vehicle has an intention to give way to the self-vehicle. However, focusing on the relationship between the following other vehicle and the preceding other vehicle, it is shown that the speed of the following other vehicle becomes higher than the speed of the preceding other vehicle, and the inter-vehicle distance becomes short. As a result, it is estimated in conclusion that the following other vehicle has no intention to give way to the self-vehicle.

Furthermore, in this case, it is shown that the relative distance between the following other vehicle and the preceding other vehicle is maintained, and the relative speed is also maintained. In this case, independently of the relationship between the self-vehicle and the following other vehicle, for example, the driver of the following other vehicle may not be aware of the self-vehicle. Hence, it is estimated in conclusion that the following other vehicle has no intention to give way to the self-vehicle.

Case in which Relative Distance and Relative Speed Between Following Other Vehicle and Preceding Other Vehicle Decrease, and Relative Distance and Relative Speed Between Following Other Vehicle and Self-Vehicle Decrease In this case, focusing on the relationship between the following other vehicle and the preceding other vehicle, it is shown that the speed of the following other vehicle becomes higher than the speed of the preceding other vehicle, and the inter-vehicle distance becomes short. In addition, focusing on the relationship between the self-vehicle and the following other vehicle, it is shown that the speed of the following other vehicle becomes higher than the speed of the self-vehicle, and the inter-vehicle distance becomes short. As a result, it is estimated in conclusion that the following other vehicle has no intention to give way to the self-vehicle.

In this manner, the presence/absence of an intention of the following other vehicle to give way can be estimated based on the relative speed and the inter-vehicle distance between the self-vehicle and the following other vehicle and the relative speed and the inter-vehicle distance between the following other vehicle and the preceding other vehicle.

As described above, according to this embodiment, based on how a plurality of LC possible spaces change over time, each LC possible space is evaluated, and it is judged whether to perform a front lane change or a rear lane change. As a result, it is possible to perform a smooth lane change without impeding traveling of whole traffic.

Summary of Embodiment

A traveling control apparatus according to this embodiment comprises an acquisition unit configured to acquire information outside a vehicle (outside recognition camera 207, outside recognition sensor 208), a control unit configured to control traveling of the vehicle based on the information outside the vehicle, which is acquired by the acquisition unit (control unit 200), a first specifying unit configured to, if the acquisition unit acquires, as the information outside the vehicle, information of a nearby vehicle traveling near the vehicle on an adjacent lane different from a traveling lane of the vehicle and information of a preceding other vehicle traveling ahead the nearby vehicle, specify a first possible space (313), for which a lane change of the vehicle is possible, from an inter-vehicle distance between the preceding other vehicle and the nearby vehicle, a speed of the preceding other vehicle, and a speed of the nearby vehicle, a second specifying unit configured to, if the acquisition unit acquires, as the information outside the vehicle, information of the nearby vehicle traveling near the vehicle on the adjacent lane different from the traveling lane of the vehicle and information of a following other vehicle traveling behind the nearby vehicle, specify a second possible space (314), for which the lane change of the vehicle is possible, from an inter-vehicle distance between the nearby vehicle and the following other vehicle, the speed of the nearby vehicle, and a speed of the following other vehicle, and an evaluation unit configured to evaluate the first possible space specified by the first specifying unit and the second possible space specified by the second specifying unit (S108), wherein the control unit controls the traveling of the vehicle to make the lane change to the adjacent lane based on a result of the evaluation by the evaluation unit.

With this arrangement, if a plurality of targets for a lane change exist, the traveling of the vehicle can be controlled based on the evaluation results of these.

Additionally, the evaluation unit performs the evaluation based on a size of each of the first possible space and the second possible space. The evaluation unit performs the evaluation based on a distance until the vehicle reaches a position estimated to make the lane change to one of the first possible space and the second possible space. The estimated position is a middle point of each of the first possible space and the second possible space. If it is estimated that the vehicle has made the lane change to one of the first possible space and the second possible space, the evaluation unit performs the evaluation based on a time-rate change of one of the first possible space and the second possible space from each estimated time. For the estimated times, the same predetermined upper limit value is set.

With this arrangement, it is possible to perform the evaluation based on the size of the space to which the lane change is possible, the time-rate change of the space, and the distance to the position estimated to make the lane change. Since the lane change is required to be completed within a predetermined time from lighting of a turn signal, a time limit as an upper limit value can be provided. When the same upper limit value is provided for two spaces, evaluation can be performed based on a similar standard.

Also, the first specifying unit specifies the first possible space based on a position (305) of the vehicle estimated between the preceding other vehicle and the nearby vehicle, and the second specifying unit specifies the second possible space based on a position (306) of the vehicle estimated between the nearby vehicle and the following other vehicle. The first specifying unit specifies the first possible space based on a third possible space specified from the estimated inter-vehicle distance between the preceding other vehicle and the vehicle, the speed of the preceding other vehicle, and the estimated speed of the vehicle and a fourth possible space specified from the estimated inter-vehicle distance between the vehicle and the nearby vehicle, the speed of the nearby vehicle, and the estimated speed of the vehicle. The first possible space is a region specified on the adjacent lane and including the third possible space and the fourth possible space. The second specifying unit specifies the second possible space based on a fifth possible space specified from the estimated inter-vehicle distance between the nearby vehicle and the vehicle, the speed of the nearby vehicle, and the estimated speed of the vehicle and a sixth possible space specified from the estimated inter-vehicle distance between the vehicle and the following other vehicle, the estimated speed of the vehicle, and the speed of the following other vehicle. The second possible space is a region specified on the adjacent lane and including the fifth possible space and the sixth possible space.

With this arrangement, it is possible to perform the evaluation based on the space specified from the behaviors of the other vehicles on the front and rear sides of the position of the vehicle estimated on the adjacent lane.

In addition, each of the first possible space, the second possible space, the third possible space, the fourth possible space, the fifth possible space, and the sixth possible space is specified based on a model configured to calculate an acceleration/deceleration of a following vehicle using an inter-vehicle distance and a relative speed between two vehicles. Each of the first possible space, the second possible space, the third possible space, the fourth possible space, the fifth possible space, and the sixth possible space is specified as a space in which a magnitude of the acceleration/deceleration is not more than a predetermined value.

With this arrangement, it is possible to perform the evaluation based on the space specified from the behaviors of the other vehicles on the front and rear sides of the position of the vehicle estimated on the adjacent lane using an IDM model.

The traveling control apparatus further comprises a third specifying unit configured to, if the acquisition unit acquires, as the information outside the vehicle, information of a second preceding other vehicle that is a vehicle traveling on the traveling lane of the vehicle and is traveling ahead the vehicle, specify a seventh possible space (325), for which the lane change of the vehicle is possible, from an inter-vehicle distance (323) between the second preceding other vehicle and the vehicle, a speed of the second preceding other vehicle, and the speed of the vehicle, and a fourth specifying unit configured to, if the acquisition unit acquires, as the information outside the vehicle, information of a second following other vehicle that is a vehicle traveling on the traveling lane of the vehicle and is traveling behind the vehicle, specify an eighth possible space (326), for which the lane change of the vehicle is possible, from an inter-vehicle distance (324) between the second following other vehicle and the vehicle, a speed of the second following other vehicle, and the speed of the vehicle, and the evaluation unit evaluates the first possible space specified by the first specifying unit and the second possible space specified by the second specifying unit based on the seventh possible space specified by the third specifying unit and the eighth possible space specified by the fourth specifying unit.

With this arrangement, it is possible to perform the evaluation based on the space specified from the behaviors of the other vehicles on the self-lane.

Additionally, each of the seventh possible space and the eighth possible space is specified based on a model configured to calculate an acceleration/deceleration of a following vehicle using an inter-vehicle distance and a relative speed between two vehicles. Each of the seventh possible space and the eighth possible space is specified as a space in which a magnitude of the acceleration/deceleration is not more than a predetermined value.

With this arrangement, it is possible to perform the evaluation based on the space specified from the behaviors of the other vehicles on the self-lane using an IDM model.

The invention is not limited to the foregoing embodiments, and various variations/changes are possible within the spirit of the invention.

What is claimed is:

1. A traveling control apparatus comprising:
    at least one processor circuit with a memory comprising instructions, that when executed by the processor circuit, causing the processor circuit to at least:
        acquire information outside a vehicle;
        control traveling of the vehicle based on the acquired information outside the vehicle;
        information of a nearby vehicle traveling near the vehicle on an adjacent lane different from a traveling lane of the vehicle and information of a preceding other vehicle traveling ahead the nearby vehicle is acquired as the information outside the vehicle, specify a first possible space, for which a lane change of the vehicle is possible, from an inter-vehicle distance between the preceding other vehicle and the nearby vehicle, a speed of the preceding other vehicle, and a speed of the nearby vehicle;
        information of the nearby vehicle traveling near the vehicle on the adjacent lane different from the traveling lane of the vehicle and information of a following other vehicle traveling behind the nearby vehicle is acquired as the information outside the vehicle, specify a second possible space, for which the lane change of the vehicle is possible, from an inter-vehicle distance between the nearby vehicle and the following other vehicle, the speed of the nearby vehicle, and a speed of the following other vehicle;
        evaluate the specified first possible space and the specified second possible space, based on a time-rate change of each of the first possible space and the second possible space; and
        control the traveling of the vehicle to make the lane change to either the first possible space or the second possible space which has a larger estimation value in the adjacent lane based on a result of the evaluation; and
    wherein each of the first possible space and the second possible space is specified based on a model configured to calculate an acceleration/deceleration of a following vehicle using an inter-vehicle distance and a relative speed between two vehicles,
    the first possible space and the second possible space is specified in an inter-vehicle space as a space in which a magnitude of the acceleration/deceleration is not more than a predetermined value,
    if one of the first possible space and the second possible space becomes larger than the other along the time-rate change, the larger one has a larger estimation value than the other.

2. The apparatus according to claim 1, wherein the evaluation is performed based on a size of each of the first possible space and the second possible space.

3. The apparatus according to claim 1, wherein the evaluation is performed based on a distance until the vehicle reaches a position estimated to make the lane change to one of the first possible space and the second possible space.

4. The apparatus according to claim 3, wherein the estimated position is a middle point of each of the first possible space and the second possible space.

5. The apparatus according to claim 1, wherein the first possible space is specified based on a position of the vehicle estimated between the preceding other vehicle and the nearby vehicle, and
    the second possible space is specified based on a position of the vehicle estimated between the nearby vehicle and the following other vehicle.

6. The apparatus according to claim 5, wherein the first possible space is specified based on a third possible space specified from the estimated inter-vehicle distance between the preceding other vehicle and the vehicle, the speed of the preceding other vehicle, and the estimated speed of the vehicle and a fourth possible space specified from the estimated inter-vehicle distance between the vehicle and the nearby vehicle, the speed of the nearby vehicle, and the estimated speed of the vehicle.

7. The apparatus according to claim 6, wherein the first possible space is a region specified on the adjacent lane and including the third possible space and the fourth possible space.

8. The apparatus according to claim 5, wherein the second possible space is specified based on a fifth possible space specified from the estimated inter-vehicle distance between the nearby vehicle and the vehicle, the speed of the nearby vehicle, and the estimated speed of the vehicle and a sixth possible space specified from the estimated inter-vehicle distance between the vehicle and the following other vehicle, the estimated speed of the vehicle, and the speed of the following other vehicle.

9. The apparatus according to claim 8, wherein the second possible space is a region specified on the adjacent lane and including the fifth possible space and the sixth possible space.

10. The apparatus according to claim 1, wherein the at least one processor circuit is further caused to:
    if information of a second preceding other vehicle that is a vehicle traveling on the traveling lane of the vehicle and is traveling ahead the vehicle is acquired as the information outside the vehicle, specify a seventh possible space, for which the lane change of the vehicle is possible, from an inter-vehicle distance between the second preceding other vehicle and the vehicle, a speed of the second preceding other vehicle, and the speed of the vehicle; and if information of a second following other vehicle that is a vehicle traveling on the traveling lane of the vehicle and is traveling behind the vehicle is acquired as the information outside the vehicle, specify an eighth possible space, for which the lane change of the vehicle is possible, from an inter-vehicle distance between the second following other vehicle and the vehicle, a speed of the second following other vehicle, and the speed of the vehicle, wherein the first possible space specified and the second possible space specified are evaluated based on the seventh possible space and the eighth possible space.

11. The apparatus according to claim 10, wherein each of the seventh possible space and the eighth possible space is specified based on the model configured to calculate an acceleration/deceleration of a following vehicle using an inter-vehicle distance and a relative speed between two vehicles.

12. The apparatus according to claim 11, wherein each of the seventh possible space and the eighth possible space is specified as a space in which a magnitude of the acceleration/deceleration is not more than a predetermined value.

13. A traveling control method executed by a traveling control apparatus comprising:

the traveling control apparatus comprises at least one processor circuit with a memory comprising instructions, that when executed by the processor circuit, causing the processor circuit to perform steps including:

acquiring information outside a vehicle;

controlling traveling of the vehicle based on the acquired information outside the vehicle;

if information of a nearby vehicle traveling near the vehicle on an adjacent lane different from a traveling lane of the vehicle and information of a preceding other vehicle traveling ahead the nearby vehicle are acquired as the information outside the vehicle, specifying a first possible space, for which a lane change of the vehicle is possible, from an inter-vehicle distance between the preceding other vehicle and the nearby vehicle, a speed of the preceding other vehicle, and a speed of the nearby vehicle;

if information of the nearby vehicle traveling near the vehicle on the adjacent lane different from the traveling lane of the vehicle and information of a following other vehicle traveling behind the nearby vehicle are acquired as the information outside the vehicle, specifying a second possible space, for which the lane change of the vehicle is possible, from an inter-vehicle distance between the nearby vehicle and the following other vehicle, the speed of the nearby vehicle, and a speed of the following other vehicle; and evaluating the specified first possible space and the specified second possible space, based on a time-rate change of each of the first possible space and the second possible space;

wherein in the controlling, the traveling of the vehicle is controlled to make the lane change to either the first possible space or the second possible space which has a larger estimation value in the adjacent lane based on a result of the evaluation, wherein each of the first possible space and the second possible space is specified based on a model configured to calculate an acceleration/deceleration of a following vehicle using an inter-vehicle distance and a relative speed between two vehicles, the first possible space and the second possible space is specified in an inter-vehicle space as a space in which a magnitude of the acceleration/deceleration is not more than a predetermined value, and if one of the first possible space and the second possible space becomes larger than the other along the time-rate change, the larger one has an larger estimation value than the other.

14. A non-transitory computer-readable storage medium storing a program configured to cause a computer to function to:

acquire information outside a vehicle;

control traveling of the vehicle based on the acquired information outside the vehicle;

if information of a nearby vehicle traveling near the vehicle on an adjacent lane different from a traveling lane of the vehicle and information of a preceding other vehicle traveling ahead the nearby vehicle are acquired as the information outside the vehicle, specify a first possible space, for which a lane change of the vehicle is possible, from an inter-vehicle distance between the preceding other vehicle and the nearby vehicle, a speed of the preceding other vehicle, and a speed of the nearby vehicle;

if information of the nearby vehicle traveling near the vehicle on the adjacent lane different from the traveling lane of the vehicle and information of a following other vehicle traveling behind the nearby vehicle are acquired as the information outside the vehicle, specify a second possible space, for which the lane change of the vehicle is possible, from an inter-vehicle distance between the nearby vehicle and the following other vehicle, the speed of the nearby vehicle, and a speed of the following other vehicle; and evaluate the specified first possible space and the specified second possible space based on a time-rate change of each of the first possible space and the second possible space; and, wherein in the control, the traveling of the vehicle is controlled to make the lane change to either the first possible space or the second possible space which has a larger estimation value in the adjacent lane based on a result of the evaluation; and wherein each of the first possible space and the second possible space is specified based on a model configured to calculate an acceleration/deceleration of a following vehicle using an inter-vehicle distance and a relative speed between two vehicles, the first possible space and the second possible space is specified in an inter-vehicle space as a space in which a magnitude of the acceleration/deceleration is not more than a predetermined value, and if one of the first possible space and the second possible space becomes larger than the other along the time-rate change, the larger one has a larger estimation value than the other.

* * * * *